(12) United States Patent
Seong et al.

(10) Patent No.: US 9,338,763 B2
(45) Date of Patent: *May 10, 2016

(54) METHOD AND APPARATUS FOR PROCESSING BLIND DECODING RESULTS IN A WIRELESS COMMUNICATION SYSTEM

(71) Applicant: QUALCOMM Incorporated, San Diego, CA (US)

(72) Inventors: Kibeom Seong, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/854,655

(22) Filed: Apr. 1, 2013

(65) Prior Publication Data

US 2013/0223376 A1 Aug. 29, 2013

Related U.S. Application Data

(63) Continuation of application No. 12/774,701, filed on May 5, 2010, now Pat. No. 8,446,868.

(60) Provisional application No. 61/176,482, filed on May 7, 2009.

(51) Int. Cl.
*H04W 72/02* (2009.01)
*H04L 1/00* (2006.01)
(Continued)

(52) U.S. Cl.
CPC ............. *H04W 72/02* (2013.01); *H04L 1/0038* (2013.01); *H04L 1/0052* (2013.01); *H04W 28/06* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 5,509,020 | A | 4/1996 | Iwakiri et al. |
| 5,566,206 | A | 10/1996 | Butler et al. |

(Continued)

FOREIGN PATENT DOCUMENTS

| | | |
|---|---|---|
| CN | 1138395 A | 12/1996 |
| CN | 101310551 A | 11/2008 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding" (Release 8), 3GPP TS 36.212 V8.6.0 (Mar. 2009), Section 5.3.3.1.5.

(Continued)

*Primary Examiner* — Benjamin H Elliott, IV
(74) *Attorney, Agent, or Firm* — Nerrie M. Zohn

(57) ABSTRACT

Systems and methodologies are described herein that facilitate processing and pruning of blind decoding results (e.g., associated with grant signaling) within a wireless communication environment. As described herein, blind decoding results associated with grant signaling and/or other suitable signaling can be pruned in various manners, thereby reducing false alarm probabilities associated with such results. For example, techniques are provided herein for constraining respective decoding candidates to possible radio network temporary identifier (RNTI) values, performing validity checking on payload of respective decoding candidates, and selecting a most likely decoding candidate from a previously pruned set of candidates. Further, techniques are described herein for generating filler bits (e.g., padding bits, reserved bits, etc.) in a grant message according to a predefined pattern, thereby enabling checking of such bits to further reduce false alarm rates.

29 Claims, 18 Drawing Sheets

(51) Int. Cl.
*H04W 28/06* (2009.01)
*H04W 72/04* (2009.01)

(56) References Cited

U.S. PATENT DOCUMENTS

| | | | |
|---|---|---|---|
| 5,751,725 | A | 5/1998 | Chen |
| 5,878,098 | A | 3/1999 | Wang et al. |
| 6,108,372 | A | 8/2000 | Tidemann, Jr. et al. |
| 6,112,325 | A | 8/2000 | Burshtein |
| 6,175,590 | B1 | 1/2001 | Stein |
| 6,205,130 | B1 | 3/2001 | DeJaco |
| 6,292,920 | B1 | 9/2001 | Nakano |
| 6,393,074 | B1 | 5/2002 | Mandyam et al. |
| 6,560,744 | B1 | 5/2003 | Burshtein |
| 7,076,005 | B2 | 7/2006 | Willenegger |
| 7,656,972 | B2 | 2/2010 | Willenegger |
| 7,894,390 | B2 | 2/2011 | Nakamata et al. |
| 8,446,868 | B2 | 5/2013 | Seong et al. |
| 2003/0012228 | A1 | 1/2003 | Tanaka et al. |
| 2008/0049861 | A1 | 2/2008 | Yang |
| 2008/0175196 | A1 | 7/2008 | Jen |
| 2009/0088148 | A1 | 4/2009 | Chung et al. |
| 2010/0005369 | A1 | 1/2010 | Farkas |
| 2010/0014474 | A1 | 1/2010 | Miki et al. |
| 2010/0093386 | A1 | 4/2010 | Damnjanovic et al. |

FOREIGN PATENT DOCUMENTS

| | | |
|---|---|---|
| EP | 0920160 | 6/1999 |
| EP | 1592163 | 11/2005 |
| JP | 3183236 | 8/1991 |
| JP | 11163961 | 6/1999 |
| JP | 11191758 | 7/1999 |
| JP | 2005318626 A | 11/2005 |
| JP | 2010541367 A | 12/2010 |
| TW | 1303134 B | 11/2008 |
| TW | 200849868 A | 12/2008 |
| WO | 9750219 | 12/1997 |
| WO | WO-2008041653 A1 | 4/2008 |
| WO | WO-2008055235 A2 | 5/2008 |
| WO | WO-2009041779 A1 | 4/2009 |
| WO | WO-2009044620 A1 | 4/2009 |

OTHER PUBLICATIONS

3rd Generation Partnership Project; Technical Specification Group Radio Access Network; Evolved Universal Terrestrial Radio Access (E-UTRA); Physical Channels and Modulation 3GPP TS 36.211 V8.6.0 (Mar. 2009).

3rd Generation Partnership Project; Technical Specification Group Radio Access Network; Evolved Universal Terrestrial Radio Access (E-UTRA); Physical layer procedures (Release 8) 3GPP TS 36.213 V8.6.0 (Mar. 2009).

Ericsson: . "Summary of email discussion on DL control signaling" 3GPP Draft; RI-081522, 3rd Generation Partnership Project (3GPP), Mobile Competence Centre ; 650, Route des Lucioles ; F-06921 Sophia-Antipolis Cedex 39-42, ; France, vol. RAN WGI, No. Shenzhen, China; Mar. 30, 2008, XP050109937 [retrieved on Mar. 30, 2008].

ETSI-RAN: "Universal Mobile Telecommunications System (UTMS); Multiplexing and channel coding (FDD)" 3GPP TS 25.212 v3.5.0 REL 1999, Dec. 2000, pp. 1-63.

European Search Report—EP13020030—Search Authority—The Hague—Jul. 1, 2013.

Huawei: "PDCCH release for semi-persistent scheduling", 3GPP Draft; R1-090116 36.213 PDCCH Release for Semi-Persistent Scheduling, 3rd Generation Partnership Project (3GPP), Mobile Competence Centre ; 650, Route des Lucioles ; F-06921 Sophia-Antipolis Cedex ; France, No. Ljubljana; 20090107, Jan. 7, 2009, XP050318056, [retrieved on Jan. 7, 2009].

International Search Report and Written Opinion—PCT/US2010/033937—International Search Authority, European Patent Office,Jan. 10, 2011.

LG Electronics Inc: "Simultaneous Grant Reception" 3GPP Draft; R2-092065 on Simultaneous Grant Reception, 3rd Generation Partnership Project (3GPP), Mobile Competence Centre ; 650, Route des Lucioles ; F-06921 Sophia- Antipolis Cedex ; France, No. Seoul, Korea; 20090317, Mar. 17, 2009, XP050339934 [retrieved on Mar. 17, 2009] the whole document.

Partial International Search Report—PCT/US2010/033937—International Search Authority, European Patent Office,Oct. 18, 2010.

Qualcomm Europe: "On Handling Inconsistent Control Information" 3GPP TSG-RAN WG1 56BIS, No. R1-091441, Mar. 23, 2009, pp. 1-5, XP002586569 [retrieved on Jun. 8, 2010].

Qualcomm Europe: "SPS activation with single PDCCH activation" 3GPP Draft; R2082498 SPS Activation With Single PDCCH, 3rd Generation Partnership Project (3GPP), Mobile Competence Centre; 650, Route des Lucioles; F-06921 Sophia-Antipolis Cedex; France, vol. RAN WG2, No. Kansas City, USA; Apr. 29, 2008, XP050140180 [retrieved on Apr. 29, 2008] the whole document.

Samsung,: "New Optimal Coding for Extended TFCI With Almost No Complexity Increase, 3GPP TSG-RAN WG1#7 R1-99b60," Sep. 1999.

Taiwan Search Report—TW099114733—TIPO—Mar. 13, 2013.

TIA/EIA-96, "Mobile Station-Base Station Compatibility Standard for Dual-Mode Wideband Spread Spectrum Cellular System" (Jul. 1993). cited by other.

Taiwan Search Report—TW102129559—TIPO—May 26, 2015.

LGE: "Correction of Semi-Persistent Scheduled data transmission de-activation[online]," 3GPP TSG-RAN WG1#55b R1 090198, URL: http://www.3gpp.org/ftp/tsg_ran/WG1_RL1/TSGR1_55b/Docs/R1-090198.zip, Jan. 7, 2009.

METHOD AND APPARATUS FOR PROCESSING BLIND DECODING RESULTS IN A WIRELESS COMMUNICATION SYSTEM

CROSS-REFERENCE

This application is Continuation of U.S. Ser. No. 12/774,701, filed May 5, 2010, entitled METHOD AND APPARATUS FOR PROCESSING BLIND DECODING RESULTS IN A WIRELESS COMMUNICATION SYSTEM which claims the benefit of U.S. Provisional Application Ser. No. 61/176,482, filed May 7, 2009, entitled "A METHOD AND APPARATUS FOR PDCCH BLIND DECODING FOR A WIRELESS COMMUNICATION SYSTEM," the entirety of which is incorporated herein by reference.

BACKGROUND

I. Field

The present disclosure relates generally to wireless communications, and more specifically to techniques for structuring and decoding transmissions conducted in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-input-single-output (SISO), multiple-input-single-output (MISO), single-input multiple-output (SIMO), or a multiple-input-multiple-output (MIMO) system.

In various wireless communication system deployments, devices can receive assignments for resources on which to transmit or receive information via grants and/or other suitable messaging. Conventionally, a device operating in a wireless communication does not have advance knowledge of configuration parameters (e.g., bandwidth parameters, antenna configurations, channel configurations, etc.) by which grant messaging is to be provided to the device. Accordingly, a device expecting a grant from a network can utilize blind decoding and/or other techniques for testing or otherwise checking multiple hypotheses associated with potential grant messaging. However, in the event that blind decoding generates multiple hypotheses corresponding to a grant message and/or other control signaling, it is possible for an associated device to falsely detect valid control signaling. Such false positives obtained from the blind decoding process can, in turn, adversely impact the performance of the device and/or the communication system as a whole. Accordingly, it would be desirable to implement techniques for reducing the occurrence of and/or mitigating the effects of false positives in the blind decoding process as performed by a device in a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise receiving a set of candidate grants; discarding respective received candidate grants deemed to be invalid based on at least one criterion, thereby resulting in zero or more remaining candidate grants; and selecting zero or more candidate grants from among the zero or more remaining candidate grants.

A second aspect described herein relates to a wireless communications apparatus, which can comprise a memory that stores data relating to a set of candidate grants. The wireless communications apparatus can further comprise a processor configured to discard respective candidate grants deemed to be invalid based on at least one criterion, thereby resulting in zero or more remaining candidate grants, and to select zero or more candidate grants from among the zero or more remaining candidate grants.

A third aspect relates to an apparatus, which can comprise means for receiving a set of candidate grants; means for discarding respective received candidate grants deemed to be invalid based on at least one factor to obtain zero or more remaining candidate grants; and means for selecting zero or more candidate grants from among the zero or more remaining candidate grants.

A fourth aspect described herein relates to a computer program product, which can include a computer-readable medium that comprises code for causing a computer to receive a set of candidate grants; code for causing a computer to discard respective received candidate grants deemed to be invalid based on at least one factor to obtain zero or more remaining candidate grants; and code for causing a computer to select zero or more candidate grants from among the zero or more remaining candidate grants.

According to a fifth aspect, a method is described herein. The method can comprise identifying one or more filler bits within a payload of a grant message and assigning values to the one or more filler bits within the payload of the grant message according to a predefined pattern.

A sixth aspect described herein relates to a wireless communications apparatus, which can comprise a memory that stores data relating to a predefined filler bit pattern. The wireless communications apparatus can further comprise a processor configured to assign values to one or more filler bits within a payload of a grant message according to the predefined filler bit pattern.

A seventh aspect relates to an apparatus, which can comprise means for identifying one or more filler bits corresponding to a grant message and means for assigning values to the one or more filler bits corresponding to the grant message according to a predefined pattern.

An eighth aspect described herein relates to a computer program product, which can include a computer-readable medium that comprises code for causing a computer to identify one or more filler bits corresponding to a grant message and code for causing a computer to assign values to the one or more filler bits corresponding to the grant message according to a predefined pattern.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
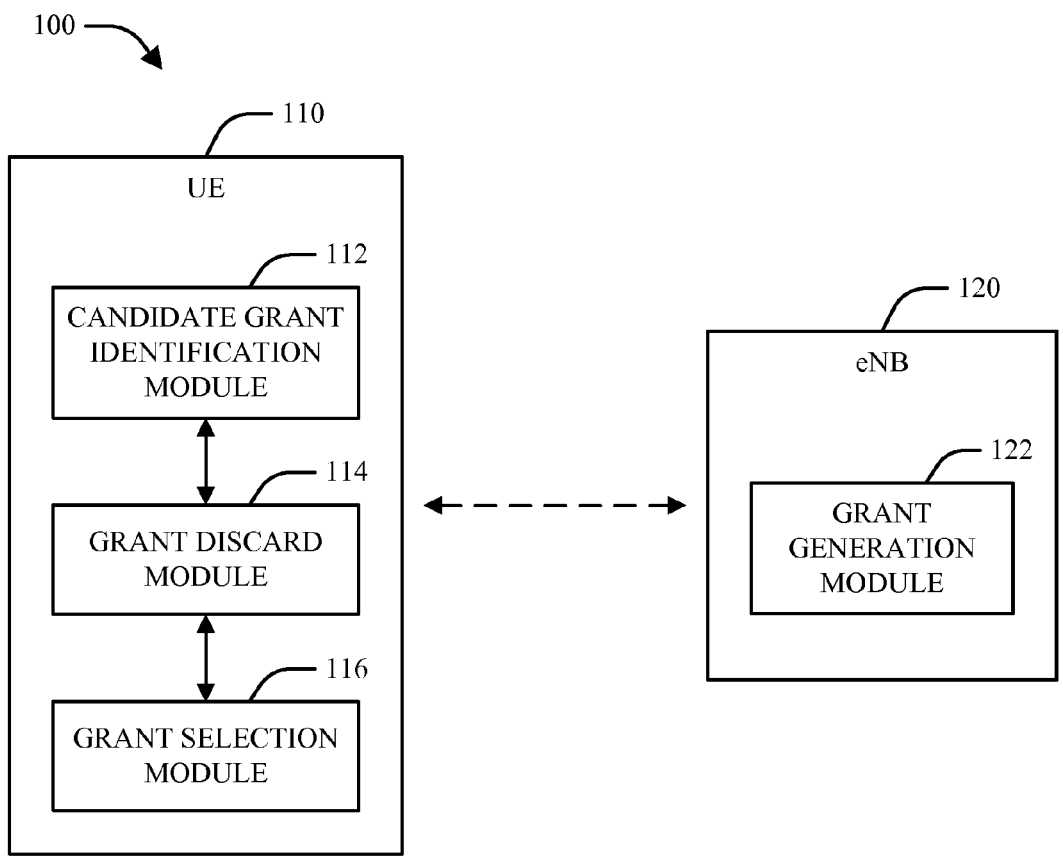
FIG. 1 is a block diagram of a system that facilitates resource grant construction and processing in a wireless communication system.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Further, various methodologies are illustrated herein that can be performed in accordance with various aspects of the claimed subject matter. While, for purposes of simplicity of explanation, the methodologies respectively provided herein are shown and described as a series of acts, it is to be understood and appreciated that the various methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring now to the drawings, FIG. 1 illustrates a system 100 that facilitates resource grant construction and processing in a wireless communication system. As FIG. 1 illustrates, system 100 can include one or more user equipment units (UEs) 110 (also referred to herein as mobile devices or stations, terminals, access terminals (ATs), etc.), which can communicate with one or more Evolved Node Bs (eNBs) 120 (also referred to herein as Node Bs, cells or network cells, network nodes, access points (APs), base stations, etc.) and/or one or more other entities in system 100. In accordance with one aspect, UE 110 can engage in one or more uplink (UL, also referred to herein as reverse link (RL)) communications with eNB 120, and similarly eNB 120 can engage in one or more downlink (DL, also referred to herein as forward link (FL)) communications to UE 110. In one example, UE 110 and eNB 120 can employ one or more antennas (not shown) to facilitate communication among each other and/or other suitable entities within system 100.

In accordance with one aspect, resources (e.g., carriers, subcarriers, sub-bands, or the like in frequency; subframes and/or other intervals in time; code allocations; etc.) that can be utilized by UE 110 for transmitting and/or receiving information within system 100 can be assigned to UE 110 via grants and/or other suitable control signaling from eNB 120. In one example, eNB 120 can generate one or more grant messages for transmission to UE 110 and/or one or more other devices via a grant generation module 122 and/or other means. In another example, multiple grants can be delivered by an eNB 120 to a given UE 110. For example, eNB 120 can provide an UL grant and a DL grant to UE 110, multiple UL and/or DL grants corresponding to respective carriers (e.g., in a multi-carrier system), and so on. In another example, separate grants can be provided for broadcast signaling (e.g., for paging, system information updates, etc.) and unicast signaling (e.g., for UE-specific data or control information).

In one example, grants communicated by eNB 120 can utilize a variety of configurations. For example, grants to respective UEs 110 can be transmitted by eNB 120 via respective resource elements (REs) and/or other resource grouping(s), respective antennas or combinations of antennas (e.g., corresponding to beams, virtual antennas, or the like), respective carriers (e.g., in a multi-carrier system), or the like. Accordingly, in order to correctly receive one or more grants from eNB 120, UE 110 can utilize blind decoding, multiple-hypothesis decoding, and/or other suitable techniques by which a set of candidate grants are analyzed to obtain one or more valid grants that are intended for UE 110. Thus, as shown in system 100, UE 110 can utilize a candidate grant identification module 112 and/or other suitable means to conduct multiple cyclic redundancy check (CRC) passes corresponding to a control channel or other means associated with eNB 120 (e.g., a Physical Downlink Control Channel (PDCCH), a Physical Broadcast Channel (PBCH), etc.) in order to receive or otherwise obtain a set of candidate grants.

In accordance with one aspect, in the case that blind decoding of a control channel generates multiple CRC passes and/or other hypotheses, UE 110 can prune the results of the blind decoding such that the correct hypotheses are selected. For example, in the case of PDCCH, blind decoding can result in 44 different decoding hypotheses to be tested on respective subframes. Further, it can be appreciated that, for each of such hypotheses, multiple radio network temporary identifier (RNTI) masking and/or other operations can potentially be applied. Accordingly, the large number of corresponding CRC computations that are required to be performed in ascertaining a correct decoding hypothesis can significantly increase the number of false alarm events, which can in turn adversely affect data transmission and/or other UE/eNB procedures. For example, in the case of grant decoding, some decoding hypotheses can correspond to invalid grants (e.g., noise and/or unrelated signaling), grants intended for devices disparate from the device performing the decoding, and/or other incorrect hypotheses. Accordingly, if an incorrect hypothesis is selected and applied as a resource grant to be utilized by UE 110, UE 110 can in some cases communicate within system 100 in a manner unexpected to eNB 120 and/or other entities in system 100, thereby resulting in excessive interference to other entities in system 100, an overall reduction in communication efficiency of UE 110 and/or overall throughput of system 100, and/or other negative consequences.

In accordance with another aspect, UE 110 can mitigate the effects of false alarms in the grant decoding process as described above by implementing one or more techniques for pruning blind decoding results and/or hypotheses as described herein. By utilizing various aspects as described herein, it can be appreciated that false alarm probability associated with decoding of a given control channel (e.g., PDCCH, PBCH, etc.) can be reduced to a substantially lowest possible level.

To the furtherance of the above and related ends, UE 110 can include a candidate grant identification module 112, which can receive a set of candidate grants (e.g., from eNB 120 and/or other suitable entities in system 100). In one example, candidate grant identification module 112 can receive a set of candidate grants at least in part by performing blind decoding with respect to an associated control channel, such as a control channel that carries resource allocation information for a Physical Downlink Shared Channel (PDSCH) or a Relay PDSCH (R-PDSCH) and/or any other suitable control channel. Examples of control channels that can be processed as described herein include PDCCH, PBCH, or the like. Upon performing blind decoding, candidate grant identification module 112 can identify a set of candidate grants based on the blind decoding. Further, UE 110 can include a grant discard module, which can discard respective received candidate grants deemed to be invalid based on at least one criterion, thereby resulting in zero or more remaining candidate grants. Various criteria that can be utilized by grant discard module 114 to discard respective candidate grants are described in further detail herein. In addition, UE 110 can include a grant selection module 116 that can select zero or more candidate grants from among the zero or more remaining candidate grants as processed by grant discard module 114.

Accordingly, by utilizing modules 112-116, it can be appreciated that UE 110 can receive one or more grants from eNB 120 and/or another suitable entity within system 100 with reduced false alarm probability. For example, candidate grant identification module 112 can be utilized to select candidates for blind decoding on a related control channel, which can correspond to various payload sizes, search spaces, and/or other configurations that can be utilized by eNB 120 and/or other suitable entities in system 100 for providing grants to UE 110. Based on blind decoding candidates identified by candidate grant identification module 112, grant discard module 114 can then be utilized to restrict the blind decoding candidates based on validity of the candidates. In one example, validity of respective blind decoding candidates can be determined via application of CRC masks as well as RNTI value constraints, parameter validity checks, and/or other suitable procedures. Examples of various procedures that can be utilized by grant discard module 114 are described herein. Following discarding of grants deemed to be invalid, grant selection module 116 can analyze respective remaining grants based on various factors to determine a grant intended for UE 110 from among a plurality of remaining grants subsequent to discarding by grant discard module 114. In various examples, grant selection module 116 can select a single grant or multiple grants (e.g., corresponding to respective carriers, UL and/or DL operation, etc.), based on various factors.

In accordance with various aspects, respective techniques by which grant discard module 114 and grant selection module 116 can operate are provided herein. It should be appreciated, however, that grant discard module 114 and/or grant selection module 116 need not be utilized in all cases. For example, UE 110 may in some cases perform acceptable grant processing via grant selection module 116 with substantially no use of a grant discard module 114, or via grant discard module 114 with substantially no use of a grant selection module 116.

In accordance with one aspect, grant discard module 114 and grant selection module 116 can cooperate to process candidate grants provided by eNB 120 in a variety of manners. For example, grant discard module 114 can be utilized to constrain applied RNTI values in decoding an associated control channel (e.g., PDCCH) based on an operation mode associated with UE 110. Further, grant discard module 114 can perform sanity checking on decoded candidate grant payloads to filter out hypotheses with invalid contents. Additionally or alternatively, grant selection module 116 can be utilized to select one or more most probable candidate grants in order to minimize false alarm rates. Various examples by which each of the above aspects can be utilized are provided in further detail herein. It should be appreciated, however, that all of the above acts need not be performed in all cases and that various embodiments of the aspects provided herein can utilize any suitable combination of one or more of the aspects provided herein. Further, unless explicitly stated otherwise, it is to be appreciated that the claimed subject matter is not intended to be limited to any specific implementation or combination thereof.

In the following description, various examples are described for the specific, non-limiting example of PDCCH grant decoding. It should be appreciated, however, that any suitable control channel can be analyzed and processed using some or all of the aspects provided herein. For example, various aspects as described herein can be applied to PBCH and/or any other suitable channel(s). For example, various techniques herein can be utilized in the context of an acquisition procedure and/or other suitable procedures that can be performed by UE 110, wherein UE 110 is required to decode synchronization sequences (e.g., a primary synchronization sequence (PSS), secondary synchronization sequence (SSS), etc.) and an associated PBCH. In such a scenario, it can be appreciated that UE 110 can perform blind decoding of PBCH based on, for example, antennas utilized to carry PBCH, radio frames utilized for PBCH, or the like. For example, in the case of a repeating PBCH transmission over four radio frames using one of three antennas, 12 blind decodes can be conducted at a given radio frame (e.g., corresponding to four candidate radio frames for the start of the PBCH transmission times the three candidate antennas). Further, it can be appreciated that as acquisition can be performed in the context of a handover, if UE 110 is required to perform multiple handover operations within a relatively short amount of time, the probability of a false alarm in the above blind decoding operations can significantly increase.

Accordingly, in order to reduce false alarm probabilities associated with PBCH acquisition, grant discard module 114 can monitor blind decoding candidates (e.g., provided by candidate grant identification module 112) to identify and prune invalid candidates. For example, in the event that PBCH transmissions carry information fields having one or more unsupported parameters, grant discard module 114 can discard candidates having unsupported values for said parameters. By way of specific example, if PBCH utilizes a 3-bit bandwidth field (e.g., having 8 possible configurations) where only a limited number (e.g., 5) of the potential field configurations are supported, grant discard module 114 can monitor for unsupported field configurations and discard respective PBCH candidates having such configurations.

Figure 2:
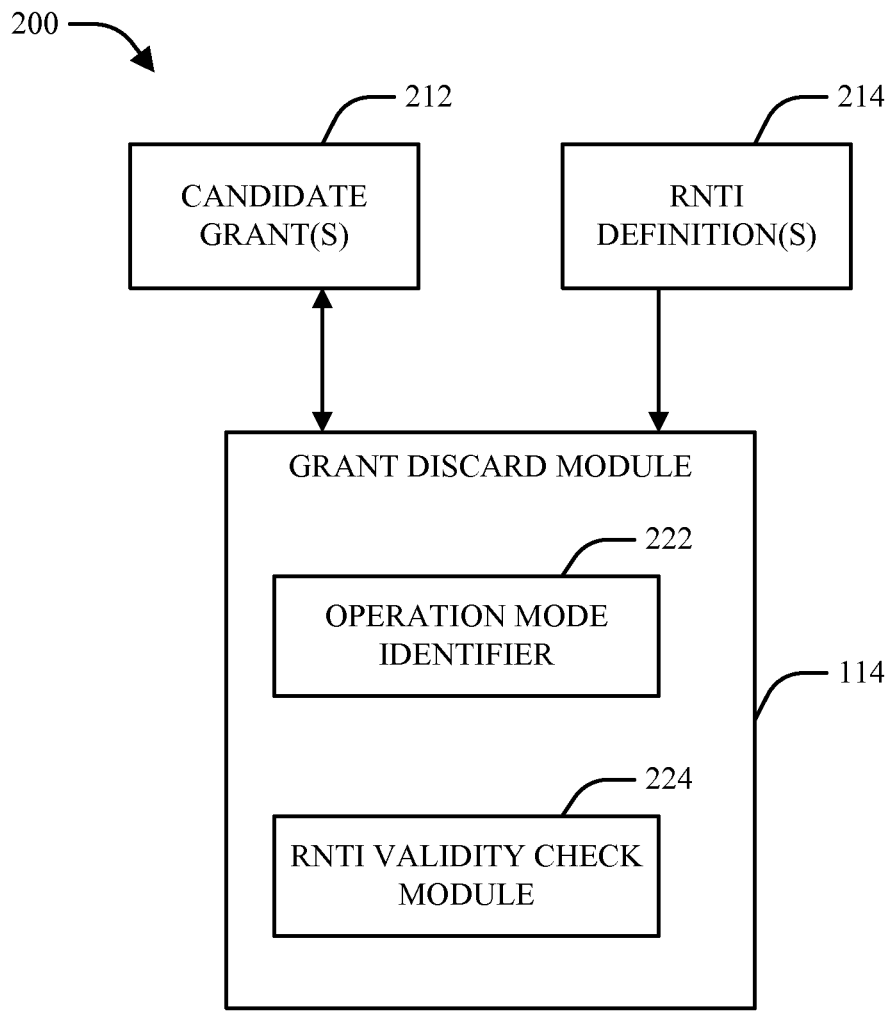
FIG. 2 is a block diagram of a system for assessing validity of blind decoding results based on radio network temporary identifier (RNTI) parameters in accordance with various aspects.

Moving to FIG. 2 and the following illustrations and related description, various examples by which grant discard module 114 and/or grant selection module 116 can operate are described in further detail. With specific reference now to FIG. 2, a block diagram of a system 200 for assessing validity of blind decoding results based on RNTI parameters is illustrated in accordance with various aspects. As shown in FIG. 2, system 200 can include a grant discard module 114, which can process a set of candidate grants 212 in order to discard respective candidate grants 212 deemed invalid based on RNTI values associated with the candidate grants 212. For example, grant discard module 114 can leverage an operation mode identifier 222 and/or other means to identify an associated operation mode. Additionally or alternatively, grant discard module 114 can construct a set of valid RNTI values corresponding to an associated operation mode identified by operation mode identifier 222 (e.g., based on one or more RNTI definitions 214). Based on such parameters, grant discard module 114 can utilize an RNTI validity check module 224 and/or other suitable mechanisms in order to discard respective candidate grants 212 determined to have RNTI values not include in the set of valid RNTI values.

By way of specific example, grant discard module 114 as shown in system 200 can be utilized to apply constraints on RNTI values associated with PDCCH decoding candidates and/or other control candidates based on operation mode. Thus, for different UEs configured semi-statically by an associated eNB, different transmission modes can be assigned such that only a subset of possible formats are required to be monitored by a given UE at a given time based on its assigned transmission mode(s). Further, RNTI validity check module 224 can make decisions relating to validity of an RNTI applied to a control decoding candidate based on common RNTI values and/or RNTI values to be monitored only at specific times (e.g., RNTIs associated with system information, paging, etc.). Thus, based on a type of traffic expected by grant discard module 114 and/or an associated device, candidate grants 212 can be pruned to only the results that would be relevant for the expected type of traffic, thereby reducing false alarms associated with RNTIs associated with other traffic types.

In the specific example of PDCCH, ten distinct downlink control information (DCI) formats can be utilized, namely formats 0, 1, 1A, 1B, 1C, 1D, 2, 2A, 3 and 3A. Among these formats, the common search space can carry DCI formats 0, 1A, 3, 3A, and/or 1C, while DCI formats 0, 1, 1A, 1B, 1D, 2 and/or 2A can be provided over the UE-specific search space.

At an eNB, it can be appreciated that 16-bit CRC generated from the PDCCH payload of each DCI format can be masked by one of the associated RNTI values, for example, in the manner shown in Table 1 below:

TABLE 1

RNTIs associated with respective DCI formats.

| DCI format | RNTI(s) |
|---|---|
| 0 | C-RNTI, SPS-C-RNTI (if valid) |
| 1 | C-RNTI, SPS C-RNTI |
| 1A | C-RNTI (if sent in UE-specific search space), C-RNTI, SPS-C-RNTI (if valid), RA-RNTI, SI-RNTI, P-RNTI (if sent in common search space), Temp C-RNTI (if valid) |
| 1B | C-RNTI |
| 1C | RA-RNTI, SI-RNTI, P-RNTI |
| 1D | C-RNTI |
| 2 | C-RNTI, SPS-RNTI |
| 2A | C-RNTI, SPS-RNTI |
| 3 | TPC-PUCCH-RNTI, TPC-PUSCH-RNTI |
| 3A | TPC-PUCCH-RNTI, TPC-PUSCH-RNTI |

At a corresponding UE (e.g., a UE that implements system 200), before checking the CRC of decoded PDCCH payload, CRC de-masking can be performed by using, for example, the RNTI values defined in Table 1 above. For example, DCI format 1A in the common search space can in some cases require 4 different CRC computations, where each uses C-RNTI, RA-RNTI, SI-RNTI, and P-RNTI as demasking values, respectively. Thus, in the case of 16-bit CRC, the probability of falsely declaring a CRC pass when the payload is incorrect in such a scenario is approximately $\frac{1}{2}^{16} \approx 1.5 \times 10^{-5}$. Further, it can be appreciated that as the number of applied RNTI values (e.g., CRC computation) increases, the occurrence of false alarm events can increase, which can be detrimental to UE/eNB procedures and/or other aspects of network performance.

Accordingly, to mitigate the effects of false alarm events as noted above, grant discard module 114, and its constituent modules 222-224, can be utilized to constrain RNTI values based on various conditions. By way of specific example, such constraints can be beneficial to the PDCCH in the common search space with multiple associated RNTI values, and/or any other suitable use cases.

Figure 3:
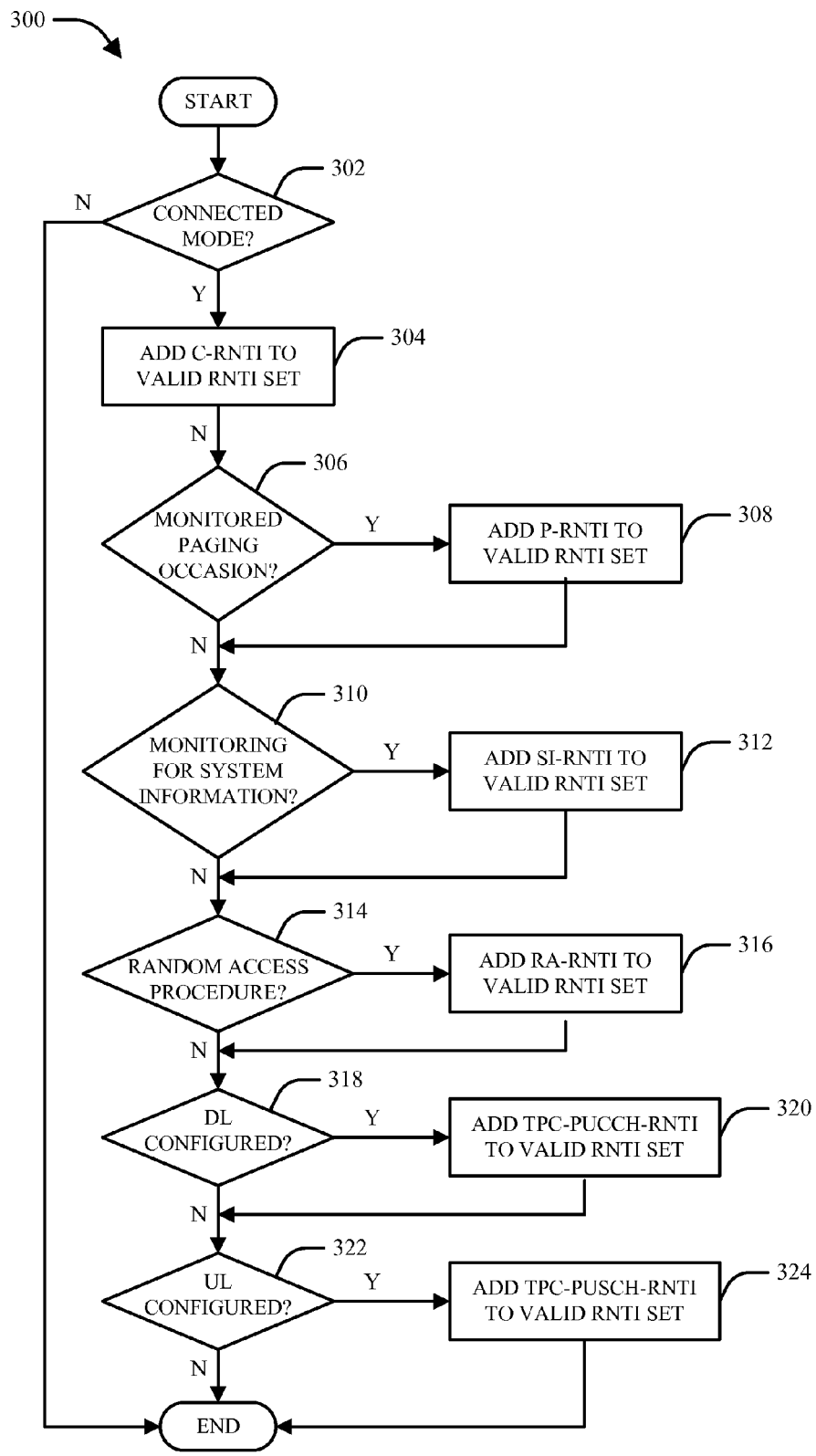
FIG. 3 is a flow diagram that illustrates an example method for constructing a valid RNTI set in accordance with various aspects.

In accordance with one aspect, a UE and/or other device associated with system 200 can be configured to monitor, via grant discard module 114 and/or other suitable mechanisms, respective RNTIs as shown by method 300 in FIG. 3. It should be appreciated, however, that method 300 is provided merely as an example of monitoring that can be performed within system 200 and that any suitable monitoring could be performed as generally described herein. As shown in FIG. 3, in response to identifying a connected operation mode at block 302, a connected RNTI (C-RNTI) value can be added to a set of valid RNTI values at block 304 and one or more further RNTI values can be configured on demand as shown in the following blocks within method 300. For example, in response to identifying a paging occasion an associated UE and/or other device intends to monitor, e.g., at block 306, a paging RNTI (P-RNTI) value can be added to the set of valid RNTI values at block 308.

In another example, in response to identifying a time interval in which system information is to be monitored or received, e.g., at block 310, a system information RNTI (SI-RNTI) value can be added to the set of valid RNTI values at block 312. In one example, a UE and/or other entity utilizing system 200 and/or otherwise performing method 300 can enable monitoring of SI-RNTI as shown at block 312 if the UE and/or other suitable entity is required to monitor SI-RNTI due to a system information change detected through a paging message, expiration of previous system information, and/or any other suitable triggering event(s). Additionally or alternatively, a SI-RNTI value can be added to a set of valid RNTI values as shown at block 312 only at given subframes and/or other time intervals where system information blocks (SIBs) can potentially occur. Thus, for example, SI-RNTI can be enabled as shown at block 312 at a given subframe (e.g., the fifth subframe) within a radio frame where a system frame number (SFN) mod 2=0, e.g., for SIB1 decoding. Upon decoding of SIB1, SI-RNTI can subsequently be enabled at the system information window where a UE and/or other associated entity is to acquire subsequent system information (e.g., SIB2, SIB3, etc.).

In a further example illustrated by method 300, in response to identifying a random access procedure (e.g., a Random Access Channel (RACH) procedure), e.g., at block 314, a random access RNTI (RA-RNTI) value can be added to a set of valid RNTI values at block 316. As further shown by method 300, monitoring of one or more RNTI values corresponding to transmit power control (TPC) can be accommodated. For example, in response to identifying an associated downlink configuration, e.g., at block 318, a TPC for Physical Uplink Control Channel (PUCCH) RNTI (TPC-PUCCH-RNTI) value can be added to a set of valid RNTI values as shown at block 320. Additionally or alternatively, in response to identifying an associated uplink configuration, e.g., at block 322, a TPC for Physical Uplink Shared Channel (PUSCH) RNTI (TPC-PUSCH-RNTI) value can be added to a set of valid RNTI values as shown at block 324.

Accordingly, as generally described above and illustrated by FIGS. 2-3, it can be appreciated that grant discard module 114 can discard one or more candidate grants 212 that are deemed to be invalid based at least in part on RNTI configurations associated with the candidate grants 212. In one specific, non-limiting example, if multiple candidate grants 212 with different RNTIs pass CRC after constraints applied as described above, one or more further procedures as described herein can be utilized. Additionally or alternatively, respective procedures as provided in the following description can be applied independently of the above procedures and/or any other procedures.

Figure 4:
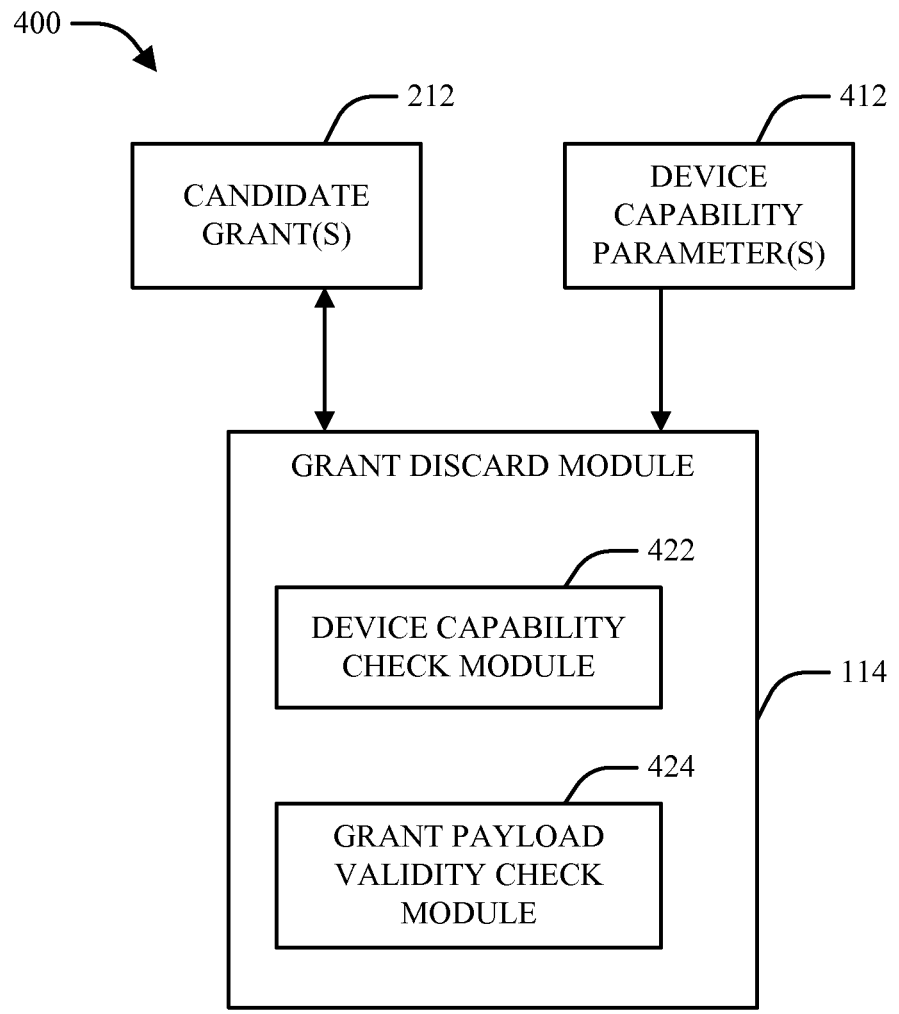
FIG. 4 is a block diagram of a system for assessing validity of blind decoding results based on device capabilities and/or constituent parameter validity in accordance with various aspects.

Turning next to FIG. 4, a block diagram of a system 400 for assessing validity of blind decoding results based on device capabilities and/or constituent parameter validity in accordance with various aspects is illustrated. As shown in FIG. 4, system 400 can include a grant discard module 114, which can operate with respect to a set of candidate grants 212 in order to discard respective candidate grants 212 deemed invalid based on validity checking with respect to payload of respective candidate grants 212.

In accordance with one aspect, grant discard module as illustrated in system 400 can prune respective candidate grants 212 by applying a sanity check or validity check on respective distinct payloads of the candidate grants 212. For example, grant discard module 114 can check payload of respective candidate grants 212 for validity according to one or more criteria (e.g., via a grant payload validity check module 424) and discard respective candidate grants 212 found to have invalid payload based on said checking. Thus, based on various rules as defined herein and/or other suitable criteria, candidate grants 212 with incorrect payload can be filtered out. In one example, zero-padding bits provided within respective candidate grants 212 can also be utilized to improve the process of deciding whether a decoded payload is corrupted or not. In one example, only candidate grants 212 satisfying respective validity check rules applied by grant discard module 114 can continue to further processing.

In one example, validity checking as performed by grant discard module 114 in system 400 can be based on capability constraints of an associated UE and/or other network entity. Thus, for example, grant discard module 114 can identify a set of associated device capabilities (e.g., device capability parameters 412) and discard respective candidate grants having payload indicative of one or more parameters outside of the set of associated device capabilities (e.g., as determined by a device capability check module 422 or the like). In another example, device capability parameters 412 can correspond to one or more distinct UE categories, each of which can be associated with respective UE capabilities. Thus, based on a category of an associated UE and/or other device associated with system 400, respective candidate grants 212 can be discarded that indicate formats, resource allocation types, resource allocations, and/or other parameters that are outside of the capabilities associated with the corresponding UE category.

Figure 5:
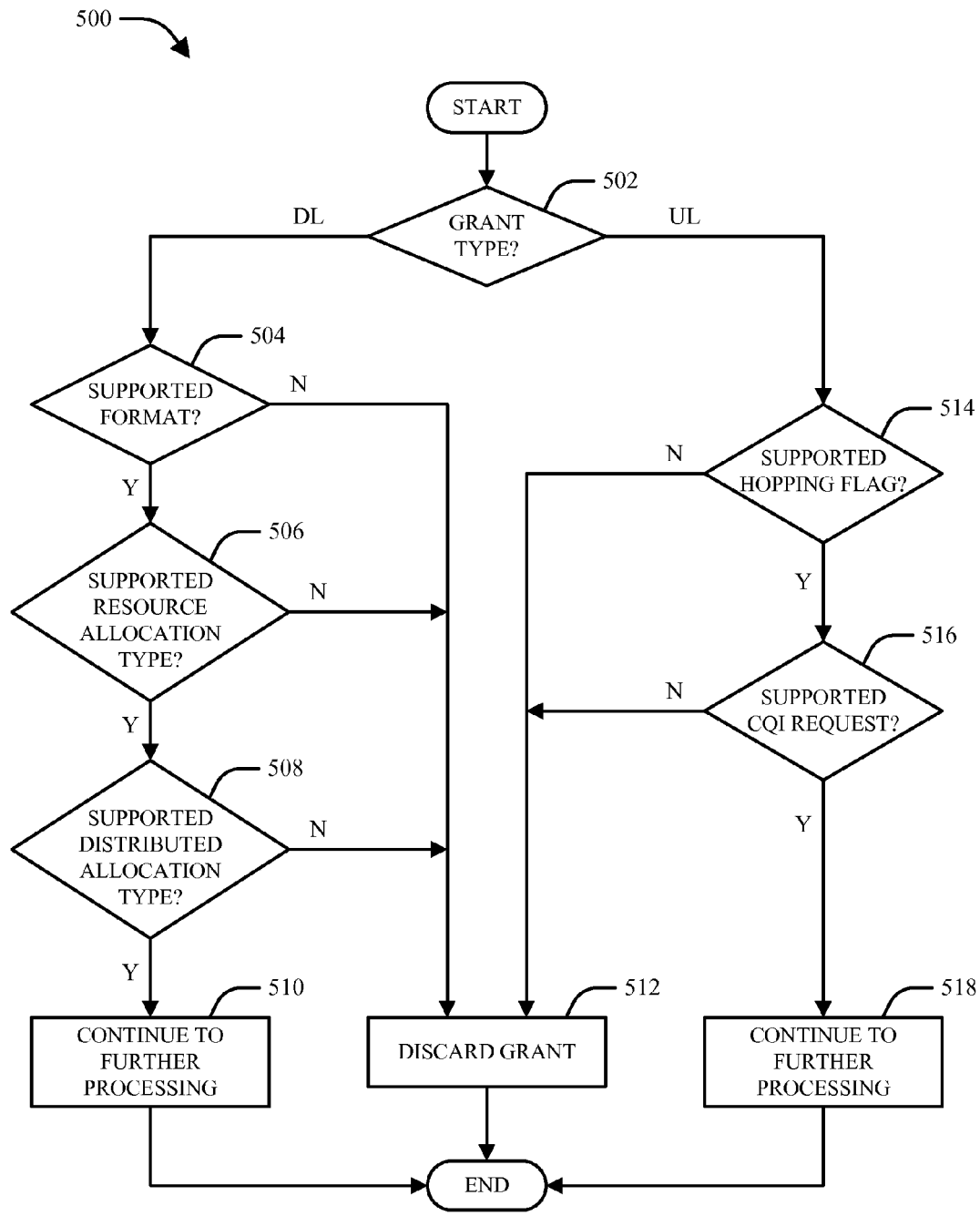
FIGS. 5-8 are flow diagrams that illustrate respective example methods for assessing validity of blind decoding results in accordance with various aspects.

In accordance with one aspect, various considerations that can be leveraged by grant discard module 114 and/or device capability check module 422 in performing validity checking with respect to a candidate grant 212 based on UE capabilities are illustrated by method 500 in FIG. 5. As shown in method 500, processing of a candidate grant 212 can differ based on whether a candidate grant 212 is a DL grant or an UL grant, as shown by block 502. If a candidate grant 212 is a DL grant, the candidate grant 212 can be checked for one or more of the conditions illustrated by blocks 504-508. If any of the conditions illustrated by blocks 504-508 are not met by the candidate grant 212, the candidate grant 212 can be discarded as shown at block 512. Otherwise, the candidate grant 212 can continue to further processing as shown at block 510.

In further detail, at block 504, a DL grant can be checked for a proper DCI format. In one example, one or more formats (e.g., format 1C, etc.) can be unsupported by an associated device, and DL grants found to be in an unsupported format can be discarded. In addition, at block 506, a DL grant can be checked for a supported resource allocation type. In one example, one or more resource allocation types (e.g., resource allocation type 1, etc.) can be unsupported by an associated device, and DL grants found to utilize an unsupported resource allocation type can be discarded. Further, various DCI formats (e.g., 1, 2, 2A, etc.) can require a given resource allocation header (e.g., 0), such that DL grants having a nonconforming resource allocation header can be discarded. In an additional example, at block 508, a DL grant can be checked for a supported distributed allocation type. In one example, one or more distributed allocation types (e.g., distributed allocation type 2, etc.) can be unsupported by an associated device, and DL grants found to utilize an unsupported distributed allocation type can be discarded. Further, various DCI formats (e.g., 1A, etc.) can require a given localized/distributed virtual resource block (VRB) flag value (e.g., 0), such that DL grants having a nonconforming flag value can be discarded.

Alternatively, if a candidate grant 212 is an UL grant, the candidate grant 212 can be checked for one or more of the conditions illustrated by blocks 514-516. If any of the conditions illustrated by blocks 514-516 are not met by the candidate grant 212, the candidate grant 212 can be discarded as shown at block 512. Otherwise, the candidate grant 212 can continue to further processing as shown at block 518. In further detail, at block 514, an UL grant can be checked for a supported hopping flag. For example, in some cases (e.g., corresponding to DCI format 0, etc.) hopping can be unsupported, and accordingly UL grants found to include a flag that indicates that hopping is supported (e.g., hopping flag=1, etc.) can be discarded as invalid. In another example, at block 516, an UL grant can be checked for a supported channel quality indicator (CQI) request bit and/or flag value. For example, if a UE associated with system 400 and/or method 500 is not configured to send CQI reports but a CQI request bit associated with an UL grant is set to '1' and/or otherwise indicates a requested CQI report, the UL grant can be discarded as invalid.

In addition to UE capability-based validity checking as described above and illustrated in FIG. 5, grant discard module 114 in system 400 can additionally perform respective general validity checks on payload of respective candidate grants 212 via grant payload validity check module 424 and/or other suitable means. For example, grant discard module 114 can be configured to discard respective candidate grants 212 having payload indicative of at least one of an invalid resource block size, an invalid modulation or coding scheme, invalid precoding information, or an invalid bandwidth configuration value. In another example, grant discard module 114 can be configured to identify a resource range associated with a device utilizing system 400 and to discard respective 212 candidate grants having payload indicative of resources outside of the associated resource range. In a third example, grant discard module 114 can be configured to identify an expected pattern to be utilized for respective filler bits (e.g., zero-padding bits, bits corresponding to reserved fields, etc.) within a grant and to discard respective candidate grants having payload comprising at least one filler bit that does not conform to the expected pattern. In a fourth example, in the event that a device associated with system 400 utilizes a semi-persistent scheduling (SPS) operation mode, grant discard module 114 can be configured to discard respective candidate grants 212 having payload that is invalid for signaling transmit diversity in response to identifying the SPS operation mode.

Figure 6:
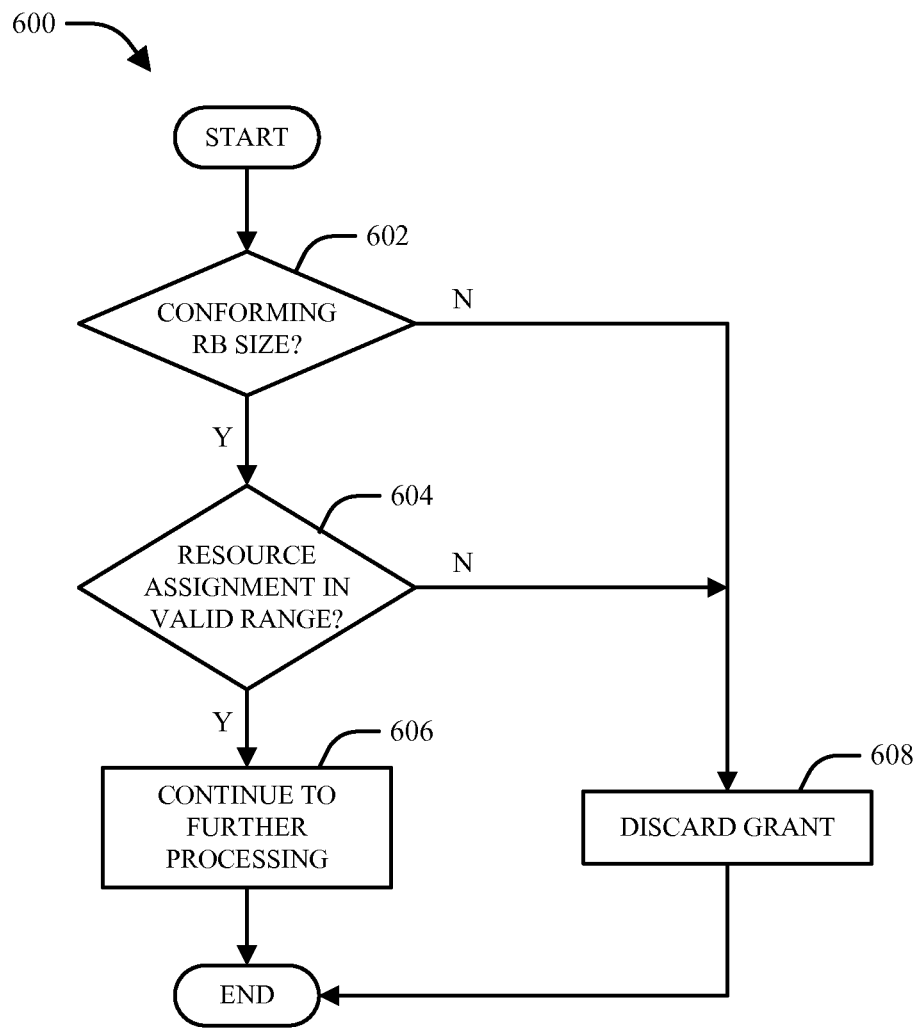
Figure 7:
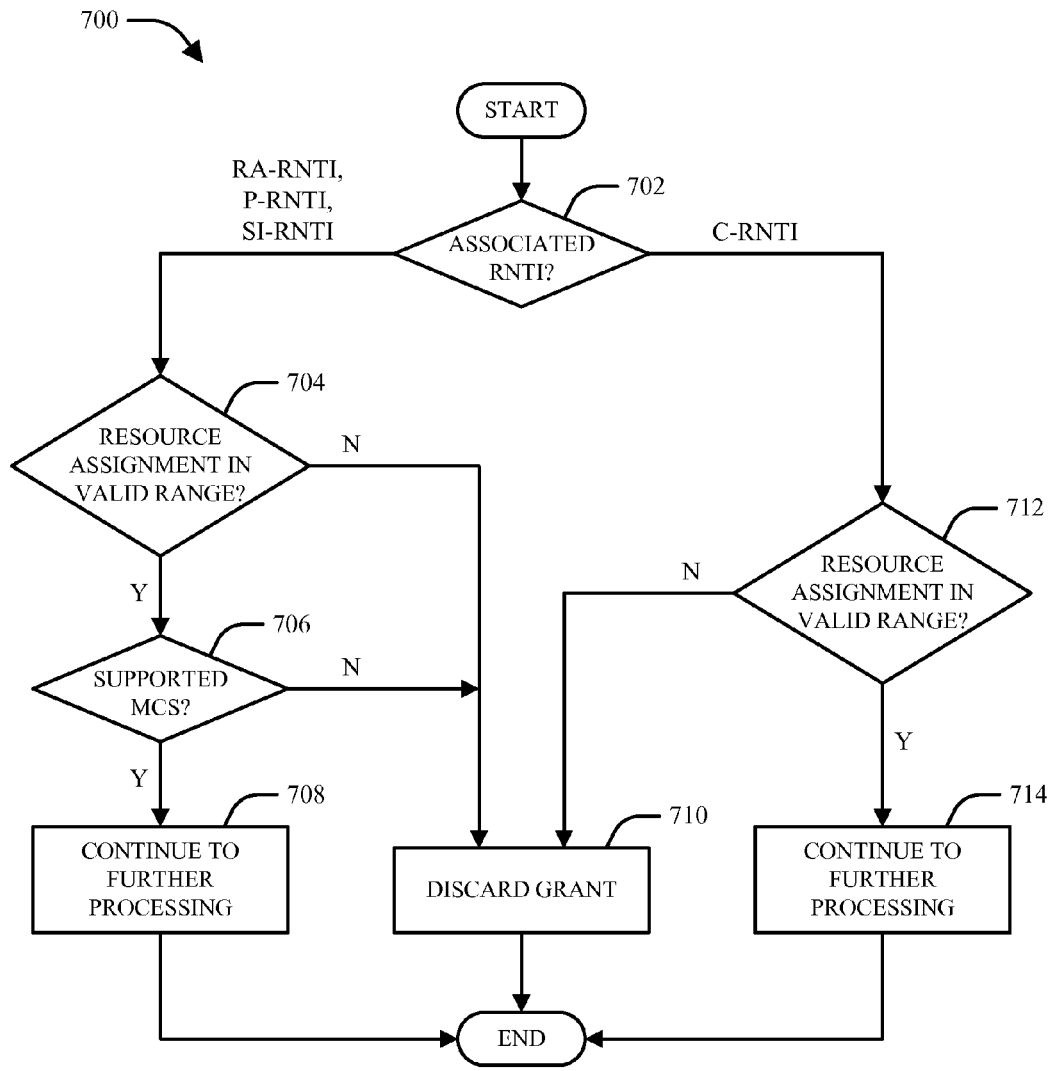
Figure 8:
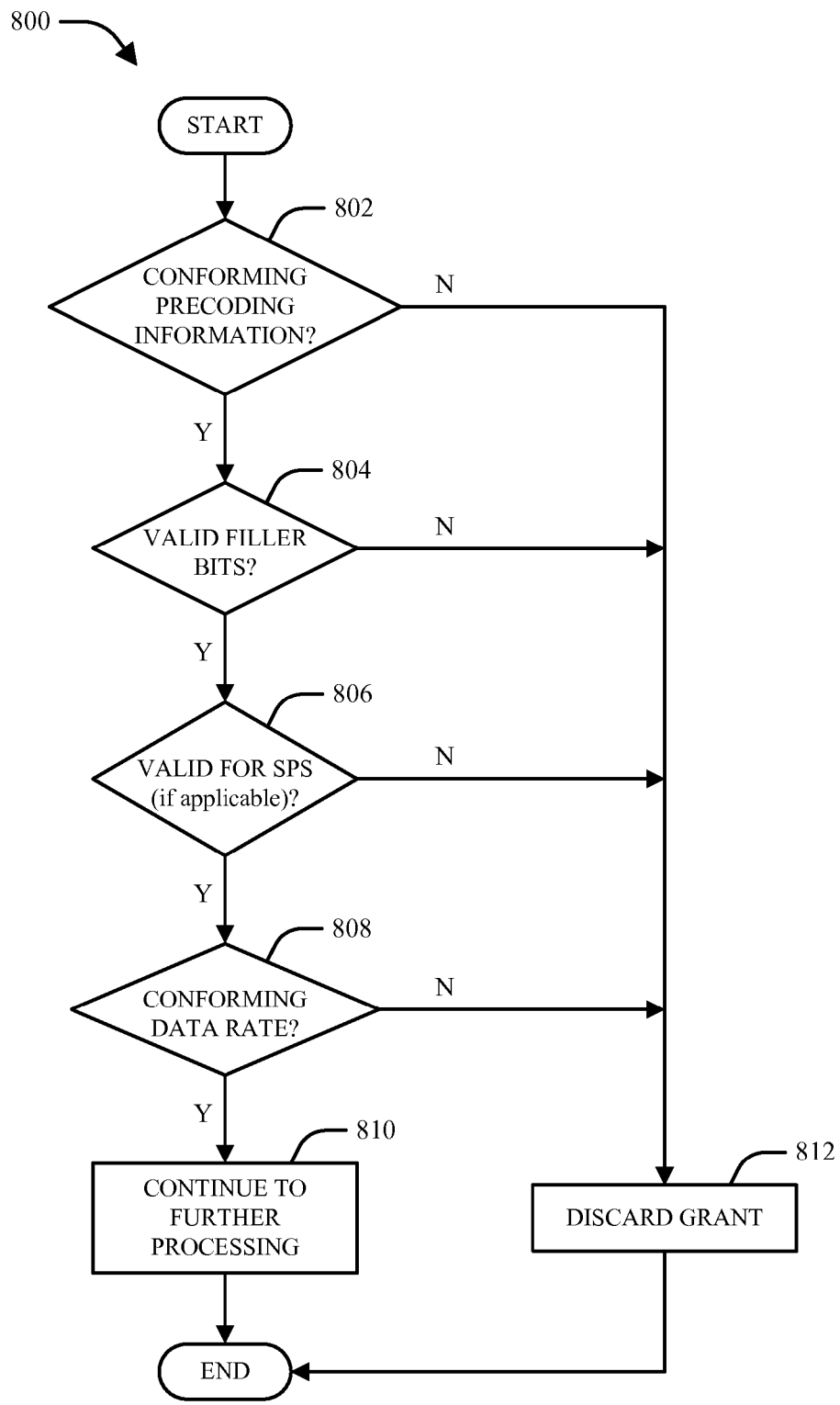

Various manners in which the above and/or other suitable rules can be applied to candidate grants 212 are described in further detail herein with respect to methods 600-800 in FIGS. 6-8, respectively. Referring first to method 600 in FIG. 6, illustrated is a method 600 for performing validity checking on grant payload for a candidate grant 212 (e.g., an UL grant, etc.) utilizing DCI format 0. As shown by method 600, a candidate grant 212 utilizing DCI format 0 can be checked for one or more of the conditions illustrated by blocks 602-604. If any of the conditions illustrated by blocks 602-604 are not met by the candidate grant 212, the candidate grant 212 can be discarded as shown at block 608. Otherwise, the candidate grant 212 can continue to further processing as shown at block 606.

As shown at block 602, discrete Fourier transform (DFT) size constraint checking and/or other suitable operations can be performed, wherein it is determined whether an associated candidate grant 212 has a conforming resource block (RB) size. In one example, a RB size indicated by a candidate grant 212 can be required to conform with a given formula (e.g., $2^{x1} \times 3^{x2} \times 5^{x3}$ for non-negative integers x1, x2, and x3, etc.) such that if the RB size does not conform to the formula the grant can be discarded as invalid. Further, as shown at block 604, resource assignment bits and/or other indicators within a candidate grant 212 can be checked to ensure that a resource assignment indicated by the grant falls within a supported range. By way of specific example, in the case of a 10 MHz system, 50 RBs (and/or any other suitable number of RBs) can be utilized. Accordingly, a number of RBs (e.g., NumRB) indicated by a grant can be constrained to values less than or equal to 50, and a starting RB index (e.g., StartRB) indicated by the grant can be constrained to ensure that the assigned RBs do not exceed 50, e.g., such that StartRB index+NumRB≤50. In one example, RBs can be configured not to wrap around from a first end to a second end; therefore, in the event that a RB allocation exceeds a maximum number of provided RBs, the corresponding grant can be discarded as invalid.

Referring next to method 700 in FIG. 7, illustrated is an example method 700 for performing validity checking on grant payload for a candidate grant 212 utilizing DCI format 1A. As shown by method 700, validity checking for a candidate grant 212 utilizing DCI format 1A can differ depending on RNTI descrambling applied to the candidate grant 212. Thus, for example, in the event that a candidate grant 212 is associated with RNTI values such as RA-RNTI, P-RNTI, SI-RNTI, or the like, the candidate grant 212 can continue to further processing as shown at block 708 or be discarded as shown at block 710 according to the conditions illustrated at blocks 704-706. Alternatively, if a candidate grant 212 is associated with RNTI values such as C-RNTI or the like, the candidate grant 212 can continue to further processing as shown at block 714 or be discarded as shown at block 710 according to a determination of whether a resource assignment associated with the candidate grant 212 is within a valid range, as shown at block 712. In accordance with one aspect, validity checking as performed at block 712 can be done in a similar manner to the validity checking described above at block 604 in method 600.

As shown at block 704, resource assignment bits and/or other indicators within a candidate grant 212 can be checked to ensure that a resource assignment indicated by the grant falls within a supported range. In one example, a supported resource range as utilized in a determination performed at block 704 can be based on a 10 MHz/50 RB system as generally described above. For example, a NumRB parameter associated with a determination made at block 704 can be dependent on the least significant bit (LSB) and/or other indicators associated with a TPC command for PUCCH and/or other suitable control channels such that, for example, NumRB is constrained to 2 for some indicators (e.g., LSB=0) and/or 3 for other indicators (e.g., LSB=1). Further, a StartRB index can be constrained to ensure that a RB allocation does not fall out of range as generally described above. Further, as shown at block 706, a modulation and coding scheme (MCS) parameter indicated by a candidate grant 212 can be checked to ensure that it falls within a supported range (e.g., MCS≤9).

Turning to method 800 in FIG. 8, respective further considerations that can be performed in the context of a validity check for a candidate grant 212 are illustrated. As shown by method 800, one or more conditions as illustrated by blocks 802-808 can be checked, such that a candidate grant 212 that fails at least one of the checked conditions can be discarded as shown at block 812. Alternatively, if the candidate grant 212 is determined to be valid based on the conditions shown at blocks 802-808, the candidate grant 212 can continue to further processing as shown at block 810.

As shown at block 802, an entity performing method 800 and/or otherwise using system 400 can check whether a candidate grant contains conforming and/or otherwise supported precoding information, in the event that a candidate grant is of a predefined format (e.g., DCI format 2) and/or otherwise is configured to contain precoding information. In one example, whether precoding information is supported can depend on a number of transmit antennas, codewords, spatial layers, etc., utilized for transmission by an associated device (e.g., corresponding to a multiple-input-multiple-output (MIMO) case or non-MIMO case, etc.). For example, if only one codeword is enabled, precoding information can be regarded as valid if it is within a predetermined set of values (e.g., precoding information ≤6). Alternatively, if multiple codewords are enabled, a different predetermined set of values (e.g., precoding information ≤2) can be utilized.

Next, as shown at block 804, a candidate grant 212 can be checked to determine whether one or more filler bits in the grant conform to a valid filler bit pattern. For example, padding bits can be provided within grants of various formats to ensure uniform size between respective control messaging types to simplify their decoding. Additionally or alternatively, one or more bits in a grant message and/or other suitable control message can correspond to respective fields that are reserved for future use. Accordingly, such bits within a candidate grant can be checked to ensure that a predefined bit pattern is followed (e.g., all-zero padding bits, a predefined pattern of '0' and '1' values, etc.), and grants found to have filler bits that do not conform to the pattern can be discarded. By way of specific example, respective candidate grants 212 can have different numbers of zero-padding bits and/or other padding bits based on their format. For example, DCI format 1A can utilize 1 padding bit (e.g., for 1.4, 5, and 10 MHz bandwidths); DCI format 0 can utilize 2, 1, 2, 2, 1, and 1 padding bit for bandwidths of 1.4, 3, 5, 10, 15, and 20 MHz, respectively; and DCI format 2A can utilize 1 padding bit (e.g., for 10 MHz bandwidths).

As shown at block 806, for various DCI formats for which semi-persistent scheduling (SPS) is applicable (e.g., DCI formats 2, 2A, etc.), a candidate grant 212 can be checked to ensure that a pattern provided in the grant is valid for signaling transmit diversity, as in some cases only transmit diversity is used for a SPS C-RNTI. Thus, by way of example, if a candidate grant 212 indicating a two-codeword assignment is received and a SPS operating mode is identified, the candidate grant 212 can be discarded as invalid as SPS requires a single-codeword assignment for purposes of diversity.

Additionally, as shown at block 808, a candidate grant 212 can be checked for a valid data rate indication. Thus, for example, if a data rate calculated from a candidate grant 212 is beyond the limitation set by a UE category, hardware capabilities, and/or other parameters of a device utilizing method 800 and/or system 400, the grant can be ignored and/or otherwise discarded. By way of specific example, if method 800 is associated with a category 2 UE and a grant is received that indicates a data rate of more than 15 Mbps, the grant can be regarded as invalid.

Figure 9:
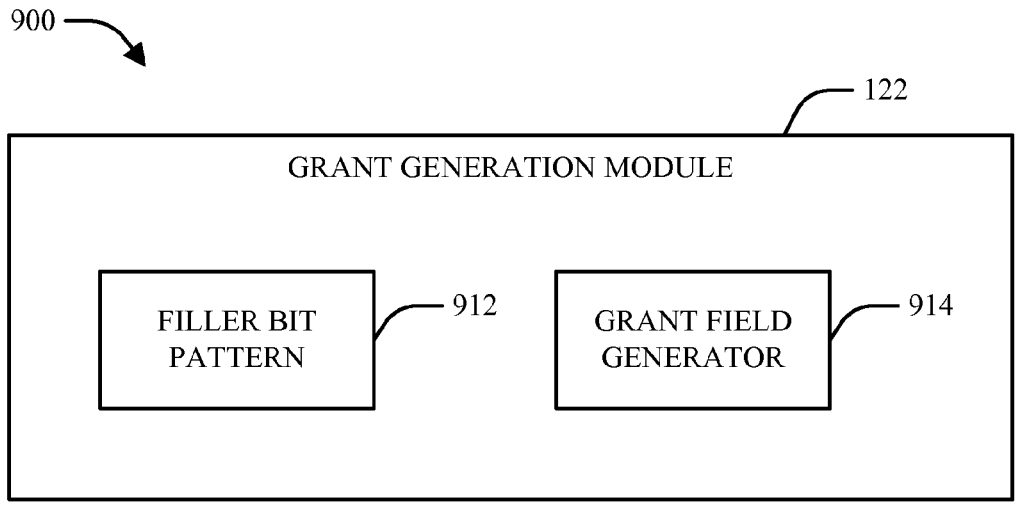
FIG. 9 is a block diagram of a system that facilitates resource grant construction in accordance with various aspects.

Turning next to FIG. 9, a block diagram of a system 900 that facilitates resource grant construction in accordance with various aspects is illustrated. As shown in FIG. 9, system 900 can include a grant generation module 122, which can be utilized by an eNB and/or any other suitable entity for generating grant messaging to be provided to one or more UEs and/or other devices in a wireless communication system. In accordance with one aspect, grant generation module 122 can facilitate improved validity checking by a device receiving its generated grants at least in part by identifying one or more filler bits within a payload of a grant message and assigning values to the one or more filler bits within the payload of the grant message according to a predefined and/or otherwise known pattern (e.g., corresponding to a filler bit pattern 912), thereby improving false alarm rates associated with grant decoding.

In one example, a grant field generator 914 and/or other suitable means associated with grant generation module 122 can identify one or more filler bits within grant messaging generated by grant generation module 122. Such filler bits can correspond to, for example, padding bits, bits corresponding to at least one reserved field within a payload of a grant message, and/or any other suitable bits and/or other information within a grant message. Further, a filler bit pattern 912 utilized by grant generation module 122 can be an all-zero pattern and/or any other suitable pattern known a priori by grant generation module (e.g., 00001111 . . . , 01010101 . . . , etc.). In accordance with one aspect, filler bit pattern 912 can be known both by grant generation module 122 and an entity responsible for checking (e.g., at a UE) grants generated by grant generation module 122, such that the checking entity can filter out decoded candidate grants that contain padding, reserved, and/or other filler bits that differ from the known pattern. As a number of reserved bits are provided within the payload of grant messaging in many cases, it can be appreciated that utilizing a known filler bit pattern 912 as described herein can provide a substantial decrease in false alarm rates.

Figure 10:
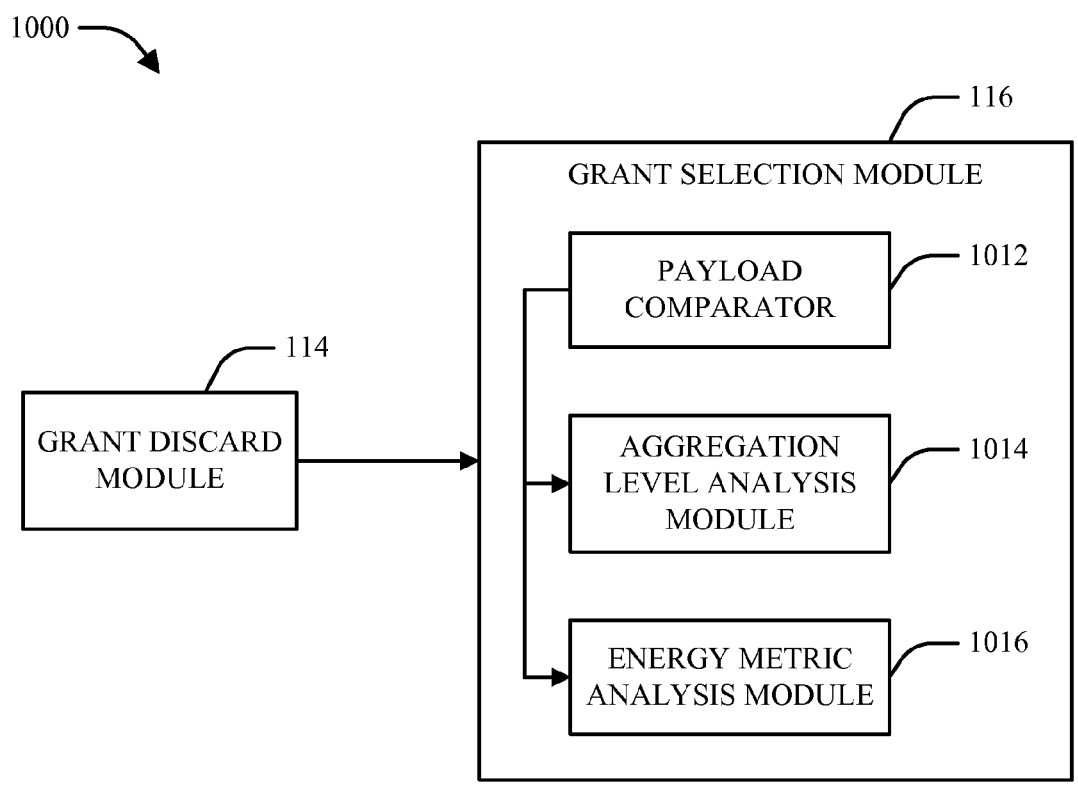
FIG. 10 is a block diagram of a system for selecting one or more resource grants from a processed set of candidate resource grants in accordance with various aspects.

Referring now to FIG. 10, a block diagram of a system 1000 for selecting one or more resource grants from a processed set of candidate resource grants in accordance with various aspects is illustrated. In accordance with one aspect, in the event that multiple candidate grants remain following processing by grant discard module 114 as generally described above, grant selection module 116 can be further employed as shown in system 100 to further prune non-relevant results (e.g., to further reduce false alarm probabilities, etc.).

In various examples as described herein, grant selection module 116 in system 1000 can select zero or more candidate grants from among zero or more remaining candidate grants (e.g., provided by grant discard module 114) based on aggregation levels associated with the zero or more remaining candidate grants. Thus, for example, selection of a candidate grant can be based on a candidate grant having a highest aggregation level, a candidate grant having a lowest aggregation level, and/or any other suitable aggregation-level related analysis (e.g., as performed by a payload comparator 1012, an aggregation level analysis module 1014, and/or other suitable means). In another example, zero or more candidate grants can be selected from zero or more remaining candidate grants (e.g., provided by grant discard module 114) based on energy metrics associated with the zero or more remaining candidate grants (e.g., as determined by a payload comparator 1012, an energy metric analysis module 1016, and/or other suitable means). Specific examples of techniques that can be utilized by payload comparator 1012, aggregation level analysis module 1014, energy metric analysis module 1016, and/or other suitable mechanisms associated with grant selection module 116 are provided in further detail herein.

Figure 11:
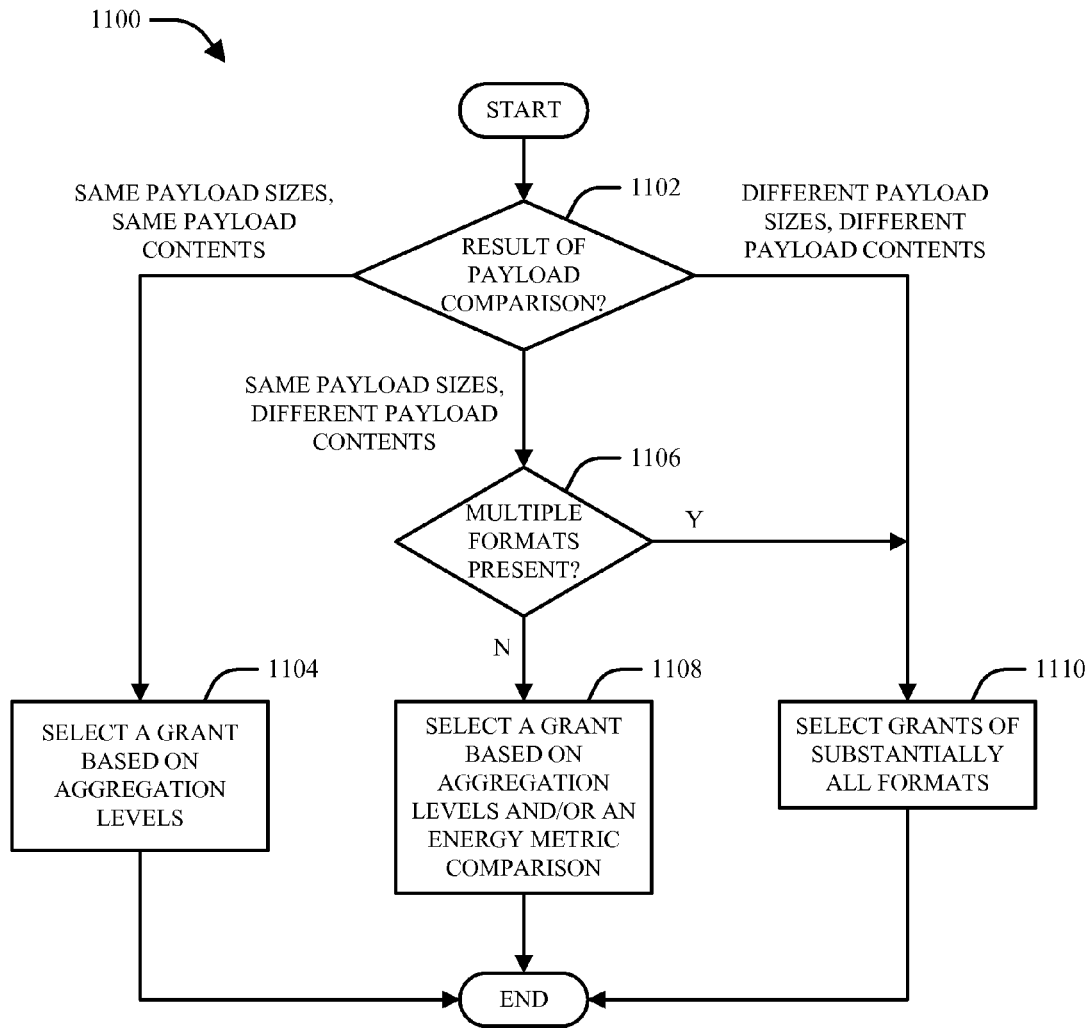
FIGS. 11-12 are block diagrams of respective example methods for performing grant selection in accordance with various aspects.

In accordance with one aspect, if respective candidate grants have the same RNTI value, e.g., such that the RNTI value is the same for multiple CRC passes, grant selection module 116 can perform one or more pruning operations based on payload sizes and payload contents of the respective candidate grants (e.g., as identified by payload comparator 1012). Various operations that can be performed by grant selection module 116 in such a scenario are illustrated in further detail by method 1100 in FIG. 11. For example, payloads associated with respective grants can initially be compared as shown at block 1102. If respective compared grants have the same payload sizes and payload contents, grant selection can proceed to block 1104, wherein a grant is selected based on aggregation levels. In accordance with one aspect, in the case of a DL grant provided via PDCCH, the starting control channel element (CCE) of PDCCH can be linked to PUCCH transmission. Accordingly, to reduce false alarm probability and/or to improve the likelihood of correct detection of the starting CCE position, a grant with a largest aggregation size can be selected. Alternatively, a grant can be selected based on any suitable function of aggregation levels (e.g., highest, lowest, etc.). In another aspect, in the event that respective grants have the same aggregation level, one or more of the grants can be selected in any suitable manner.

In accordance with another aspect, if grants compared at block 1102 have the same payload sizes but different payload contents, grant selection can be performed based on formats associated with the respective grants, as shown at block 1106. In one example, if multiple formats are present in the respective candidate grants, grants of substantially all formats can be chosen as illustrated at block 1110. For example, if grants of both DCI formats 0 and 1A are present (e.g., as determined by checking the first bit in the payload of the respective grants, wherein a '0' value indicates DCI format 0 and a '1' value indicates DCI format 1A, and/or in any other suitable manner), both grants can be chosen, e.g., one for a DL grant and one for an UL grant.

Alternatively, if multiple grants are of the same format, or payload size differs from that of DCI formats 0/1A/3/3A (e.g., 43 bits for 10 MHz), grant selection can be performed as shown in block 1108, wherein a grant can be selected based on at least two options. First, a device utilizing method 1100 or system 1000 can check an energy metric, perform re-encoding, and/or utilize other means to detect a grant from among a set of grants that is valid for the device. For example, information corresponding to a grant can be re-encoded and an energy metric of the re-encoded bits can be analyzed (e.g., by utilizing convolutional decoding and/or other means with respect to the re-encoded grant and correlating the newly decoded bits with corresponding received bits, etc.). In such an example, it can be appreciated that a matching grant can exhibit a substantially high energy metric while a mismatched grant will exhibit a substantially low energy metric, thereby enabling selection to be performed for a grant exhibiting higher energy. In a second example, selection of a grant can be performed at block 1108 according to aggregation levels, as generally described above.

In accordance with a further aspect, if a payload comparison at block 1102 reveals that respective grants have differing payload sizes and contents, substantially all of the grants can be selected, as shown at block 1110. In one example, by utilizing some or all of the pruning rules described above with respect to grant discard module 114, a number of grants selected at block 1110 can be constrained to a predefined number (e.g., two grants in the case of PDCCH, etc.). For example, selection at block 1110 can be constrained based on prior pruning to a first grant utilizing DCI format 0 in the common search space and a second grant utilizing DCI format 1 in the UE-specific search space. Thus, in some cases, grant selection module 116 and/or other suitable means can be utilized to divide zero or more remaining candidate grants (e.g., from pruning performed by grant discard module 114) into remaining uplink grants and remaining downlink grants, such that grant selection module 116 can select at least one of a remaining uplink grant or a remaining downlink grant from among the zero or more remaining candidate grants.

Figure 12:
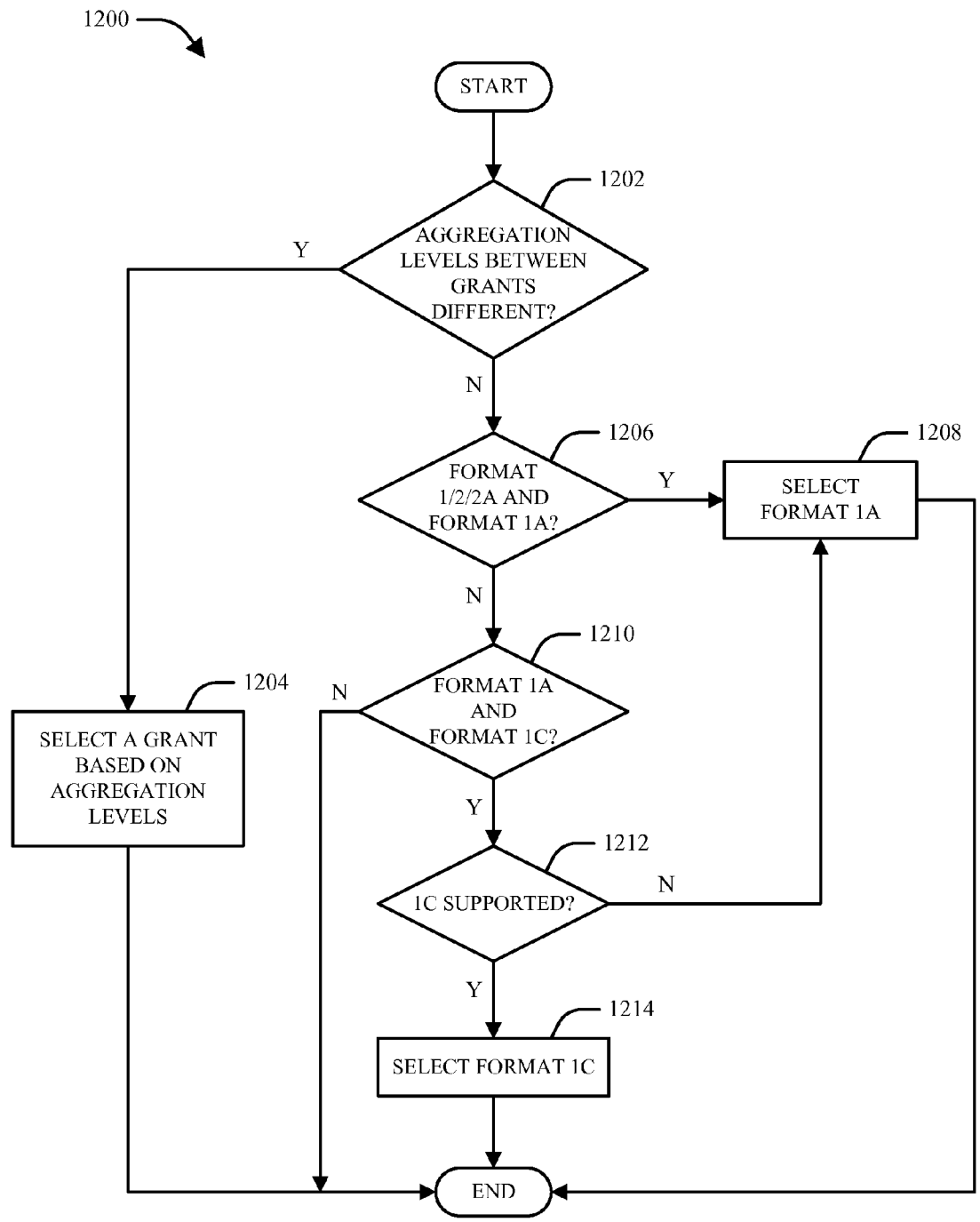

In accordance with yet another aspect, if respective candidate grants processed by grant selection module 116 include multiple DL grants, grant selection module 116 can perform further selection as illustrated by method 1200 in FIG. 12. Initially, as shown at block 1202, a determination can be made regarding whether respective remaining grants have different CCE aggregation levels. If so, a grant can be selected as shown at block 1204 based on aggregation level (e.g., based on a highest aggregation level, a lowest aggregation level, etc.). Alternatively, while not shown in method 1200, a grant can alternatively be selected based on energy metrics and/or other measurements as generally described above. Otherwise, if grants of DCI formats 2A, 2, or 1 coexist with a grant of format 1A (e.g., with C-RNTI) upon respective pruning operations, as shown at block 1206, and aggregation levels (or other selection metrics) between the respective grants tie, the grant of DCI format 1A can be selected as shown at block 1208. Further, if grants of DCI formats 1A and 1C (e.g., with the same RNTI) are present, as shown at block 1210, and aggregation levels associated with the grants do not result in selection of a grant, the grant of DCI format 1C can be selected as shown at block 1214 if such format is supported (e.g., as determined at block 1212). Otherwise, if format 1C is not supported, format 1A can be selected as shown at block 1208.

Figure 13:
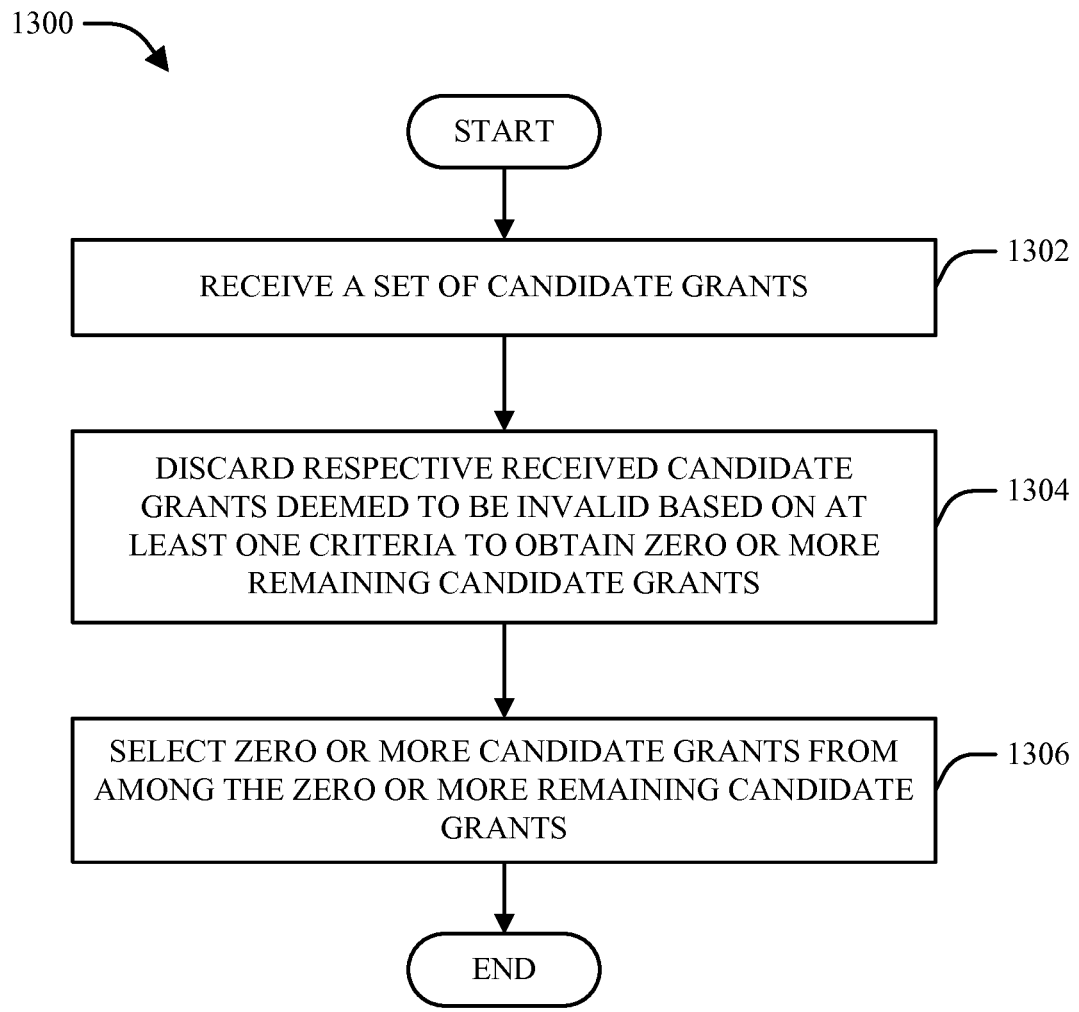
FIG. 13 is a flow diagram of a method for processing a set of candidate grants associated with a wireless communication system.
Figure 14:
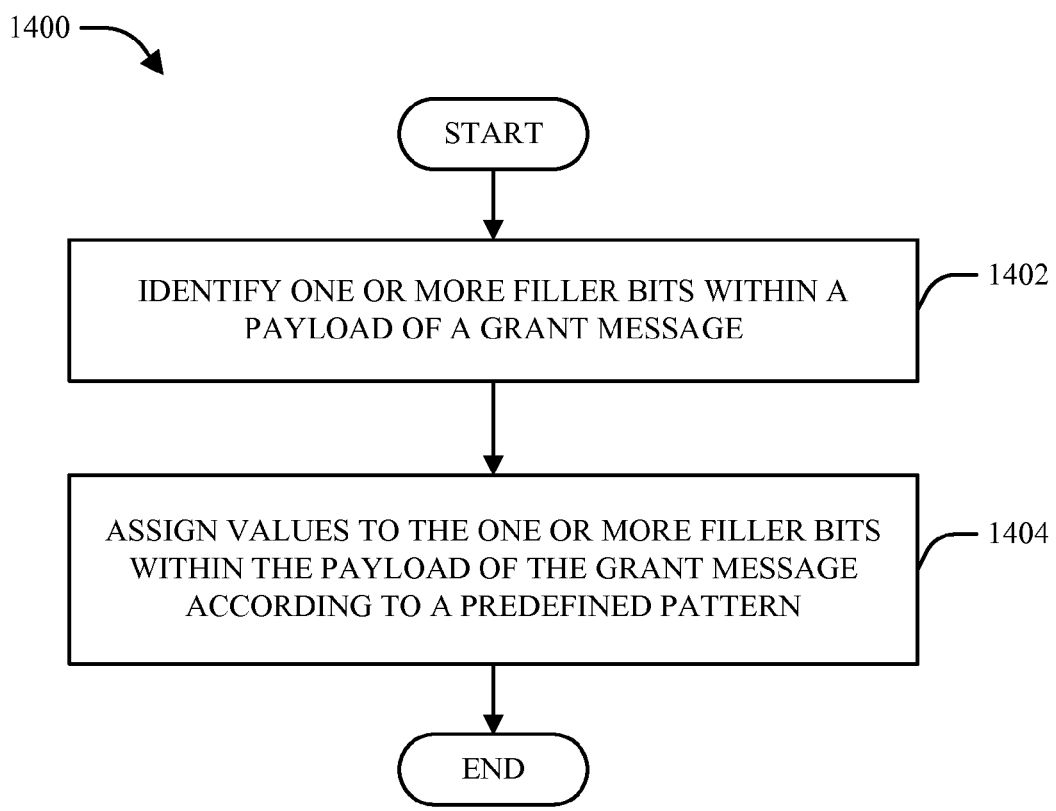
FIG. 14 is a flow diagram of a methodology for constructing a candidate grant message for communication within a wireless communication system.

Referring next to FIGS. 13-14, respective methods 1300-1400 that can be performed in accordance with various aspects set forth herein are illustrated. As noted above, while methods 1300-1400 are shown and described as a series of acts for simplicity, it is to be understood and appreciated that methods 1300-1400 are not limited by the order of acts, as some acts can, in accordance with one or more aspects, occur in different orders and/or concurrently with other acts from that shown and described herein. For example, methods 1300-1400 could alternatively be represented as a series of interrelated states or events, such as in a state diagram. Moreover, not all illustrated acts may be required to implement methods 1300 and/or 1400 in accordance with one or more aspects.

With reference to FIG. 13, illustrated is a method 1300 for processing a set of candidate grants associated with a wireless communication system. It is to be appreciated that method 1300 can be performed by, for example, a UE (e.g., UE 110) and/or any other appropriate network entity. Method 1300 begins at block 1302, wherein a set of candidate grants (e.g., candidate grants 212) are received. At block 1304, respective received candidate grants deemed to be invalid are discarded (e.g., using a grant discard module 114) based on at least one criteria to obtain zero or more remaining candidate grants. At block 1306, zero or more candidate grants are selected (e.g., via a grant selection module 116) from among the zero or more remaining candidate grants obtained at block 1304.

FIG. 14 illustrates a method 1400 for constructing a candidate grant message for communication within a wireless communication system. Method 1400 can be performed by, for example, an eNB (e.g., eNB 120) and/or any other appropriate network entity. Method 1400 can begin at block 1402, wherein one or more filler bits (e.g., padding bits, reserved bits, etc.) within a payload of a grant message are identified. At block 1404, values are assigned to the one or more filler bits within the payload of the grant message (e.g., using a grant field generator 914) according to a predefined pattern (e.g., filler bit pattern 912).

Figure 15:
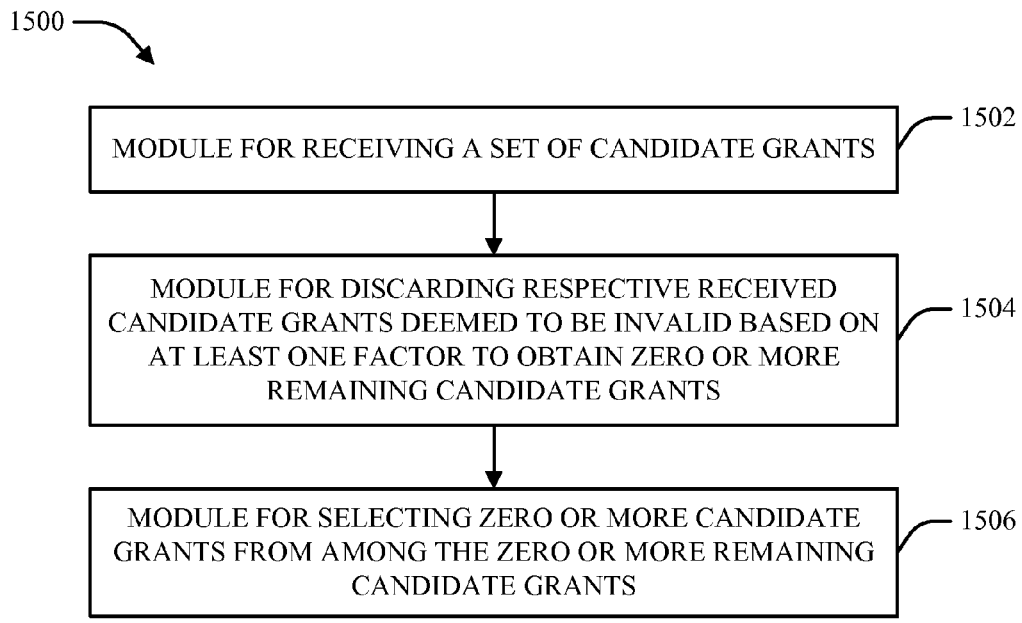
FIG. 15 is a block diagram of an apparatus that facilitates grant pruning and selection in a wireless communication system.
Figure 16:
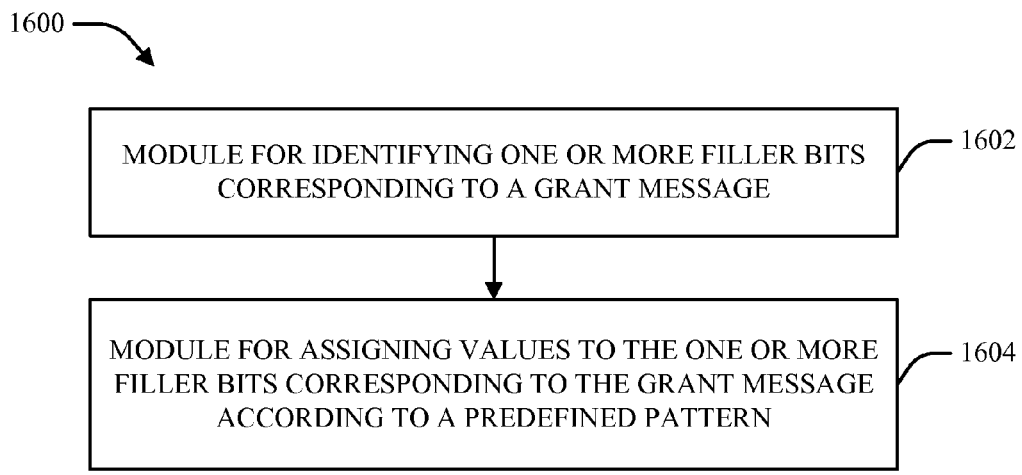
FIG. 16 is a block diagram of an apparatus that facilitates grant generation in a wireless communication system.

Referring next to FIGS. 15-16, respective apparatuses 1500-1600 that can facilitate various aspects described herein are illustrated. It is to be appreciated that apparatuses 1500-1600 are represented as including functional blocks, which can be functional blocks that represent functions implemented by a processor, software, or combination thereof (e.g., firmware).

With reference first to FIG. 15, an apparatus 1500 that facilitates grant pruning and selection in a wireless communication system is illustrated. Apparatus 1500 can be implemented by a UE (e.g., UE 110) and/or any other suitable network entity and can include a module 1502 for receiving a set of candidate grants, a module 1504 for discarding respective received candidate grants deemed to be invalid based on at least one factor to obtain zero or more remaining candidate grants, and a module 1506 for selecting zero or more candidate grants from among the zero or more remaining candidate grants.

FIG. 16 illustrates an apparatus 1600 that facilitates grant generation in a wireless communication system. Apparatus 1600 can be implemented by a base station (e.g., eNB 120) and/or any other suitable network entity and can include a module 1602 for identifying one or more filler bits corresponding to a grant message and a module 1604 for assigning values to the one or more filler bits corresponding to the grant message according to a predefined pattern.

Figure 17:
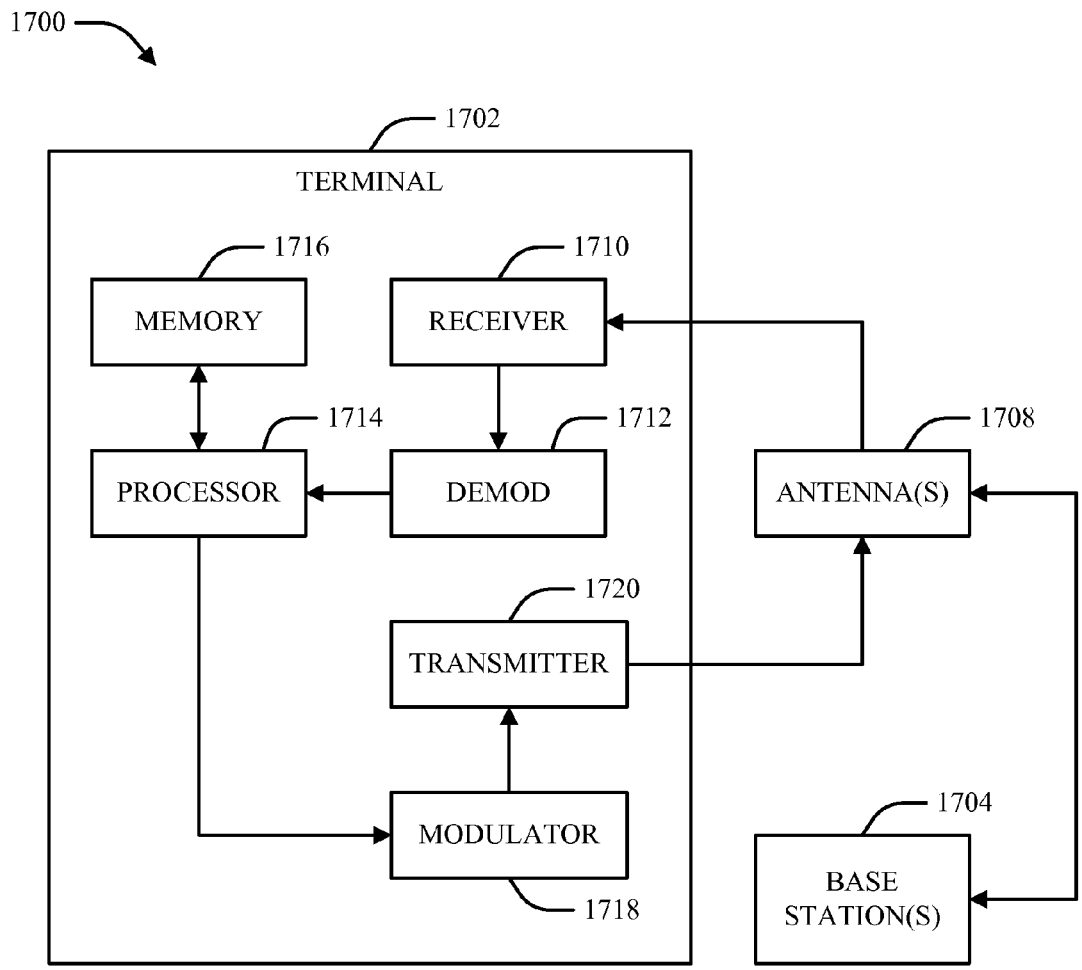
FIGS. 17-18 are block diagrams of respective wireless communication devices that can be utilized to implement various aspects described herein.

FIG. 17 is a block diagram of a system 1700 that can be utilized to implement various aspects of the functionality described herein. In one example, system 1700 includes a mobile terminal 1702. As illustrated, mobile terminal 1702 can receive signal(s) from one or more base stations 1704 and transmit to the one or more base stations 1704 via one or more antennas 1708. Further, mobile terminal 1702 can comprise a receiver 1710 that receives information from antenna(s) 1708. In one example, receiver 1710 can be operatively associated with a demodulator (Demod) 1712 that demodulates received information. Demodulated symbols can then be analyzed by a processor 1714. Processor 1714 can be coupled to memory 1716, which can store data and/or program codes related to mobile terminal 1702. In one example, processor 1714 can additionally be operable to perform one or more of the methodologies illustrated and described herein and/or other similar and appropriate methodologies. Mobile terminal 1702 can also include a modulator 1718 that can multiplex a signal for transmission by a transmitter 1720 through antenna(s) 1708.

Figure 18:
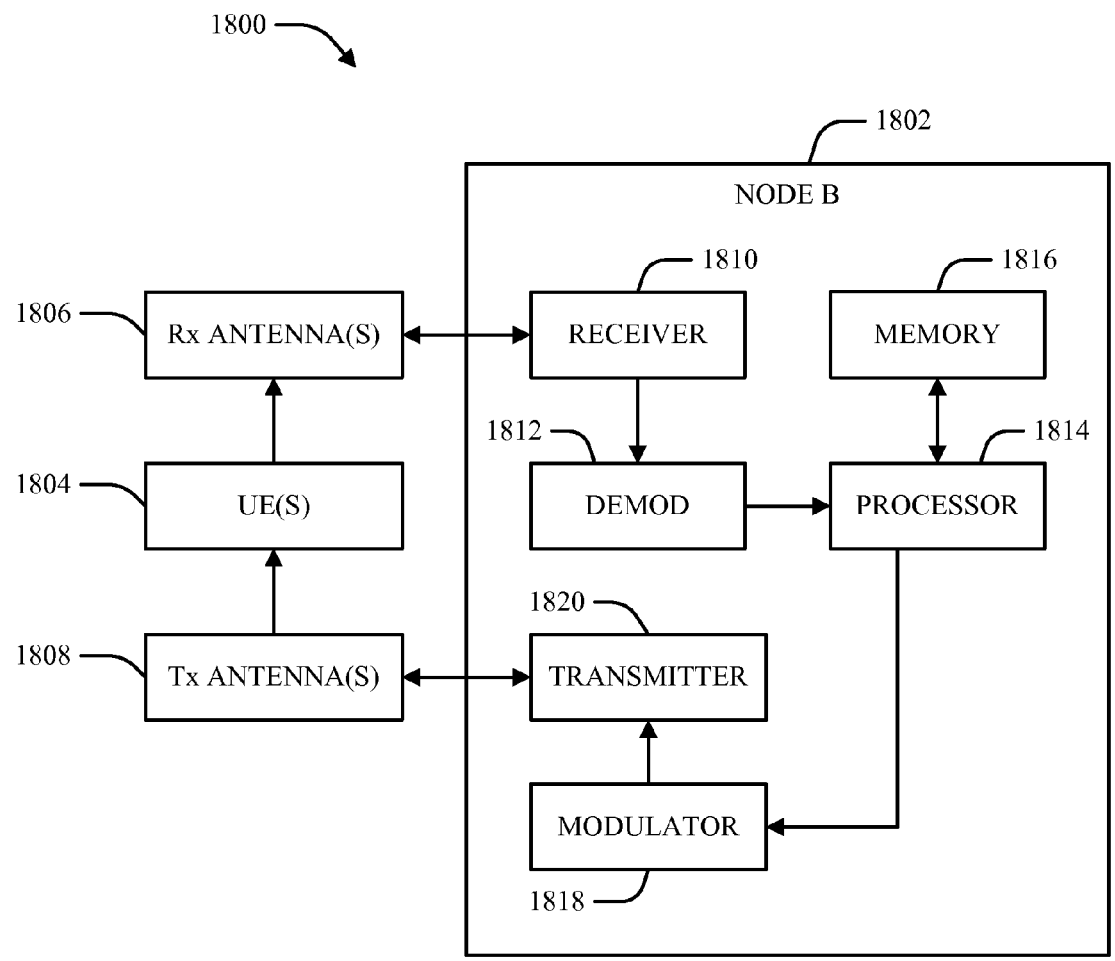

FIG. 18 is a block diagram of another system 1800 that can be utilized to implement various aspects of the functionality described herein. In one example, system 1800 includes a base station or Node B 1802. As illustrated, Node B 1802 can receive signal(s) from one or more UEs 1804 via one or more receive (Rx) antennas 1806 and transmit to the one or more UEs 1804 via one or more transmit (Tx) antennas 1808. Additionally, Node B 1802 can comprise a receiver 1810 that receives information from receive antenna(s) 1806. In one example, the receiver 1810 can be operatively associated with a demodulator (Demod) 1812 that demodulates received information. Demodulated symbols can then be analyzed by a processor 1814. Processor 1814 can be coupled to memory 1816, which can store information related to code clusters, access terminal assignments, lookup tables related thereto, unique scrambling sequences, and/or other suitable types of information. In one example, processor 1814 can additionally be operable to perform one or more of the methodologies illustrated and described herein and/or other similar and appropriate methodologies. Node B 1802 can also include a modulator 1818 that can multiplex a signal for transmission by a transmitter 1820 through transmit antenna(s) 1808.

Figure 19:
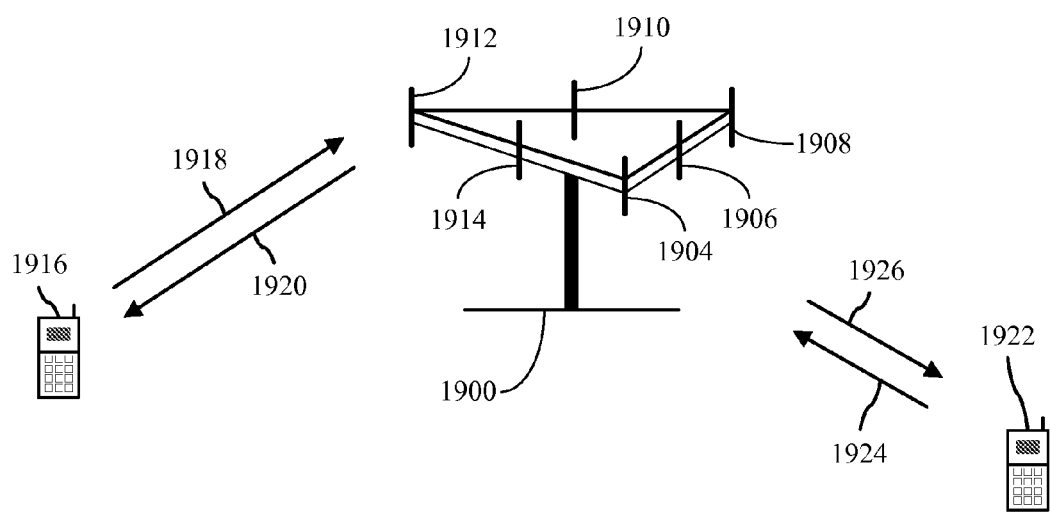
FIG. 19 illustrates a wireless multiple-access communication system in accordance with various aspects set forth herein.

Referring now to FIG. 19, an illustration of a wireless multiple-access communication system is provided in accordance with various aspects. In one example, an access point 1900 (AP) includes multiple antenna groups. As illustrated in FIG. 19, one antenna group can include antennas 1904 and 1906, another can include antennas 1908 and 1910, and another can include antennas 1912 and 1914. While only two antennas are shown in FIG. 19 for each antenna group, it should be appreciated that more or fewer antennas may be utilized for each antenna group. In another example, an access terminal 1916 can be in communication with antennas 1912 and 1914, where antennas 1912 and 1914 transmit information to access terminal 1916 over forward link 1920 and receive information from access terminal 1916 over reverse link 1918. Additionally and/or alternatively, access terminal 1922 can be in communication with antennas 1906 and 1908, where antennas 1906 and 1908 transmit information to access terminal 1922 over forward link 1926 and receive information from access terminal 1922 over reverse link 1924. In a frequency division duplex system, communication links 1918, 1920, 1924 and 1926 can use different frequency for communication. For example, forward link 1920 may use a different frequency then that used by reverse link 1918.

Each group of antennas and/or the area in which they are designed to communicate can be referred to as a sector of the access point. In accordance with one aspect, antenna groups can be designed to communicate to access terminals in a sector of areas covered by access point 1900. In communication over forward links 1920 and 1926, the transmitting antennas of access point 1900 can utilize beamforming in order to improve the signal-to-noise ratio of forward links for the different access terminals 1916 and 1922. Also, an access point using beamforming to transmit to access terminals scattered randomly through its coverage causes less interference to access terminals in neighboring cells than an access point transmitting through a single antenna to all its access terminals.

An access point, e.g., access point 1900, can be a fixed station used for communicating with terminals and can also be referred to as a base station, an eNB, an access network, and/or other suitable terminology. In addition, an access terminal, e.g., an access terminal 1916 or 1922, can also be referred to as a mobile terminal, user equipment, a wireless communication device, a terminal, a wireless terminal, and/or other appropriate terminology.

Figure 20:
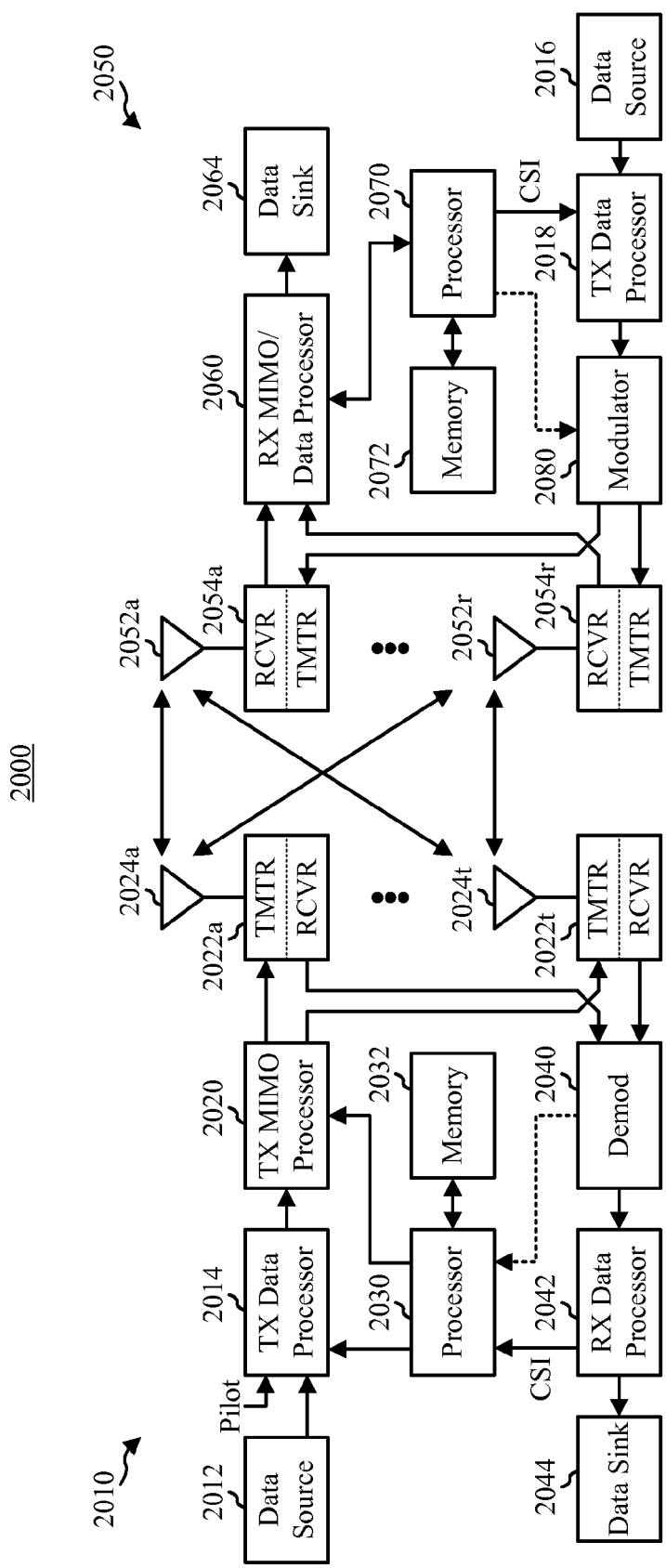
FIG. 20 is a block diagram illustrating an example wireless communication system in which various aspects described herein can function.

Referring now to FIG. 20, a block diagram illustrating an example wireless communication system 2000 in which various aspects described herein can function is provided. In one example, system 2000 is a multiple-input multiple-output (MIMO) system that includes a transmitter system 2010 and a receiver system 2050. It should be appreciated, however, that transmitter system 2010 and/or receiver system 2050 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 2010 and/or receiver system 2050 described herein could be utilized in connection with a single output to single input antenna system.

In accordance with one aspect, traffic data for a number of data streams are provided at transmitter system 2010 from a data source 2012 to a transmit (TX) data processor 2014. In one example, each data stream can then be transmitted via a respective transmit antenna 2024. Additionally, TX data processor 2014 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 2050 to estimate channel response. Back at transmitter system 2010, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 2030.

Next, modulation symbols for all data streams can be provided to a TX MIMO processor 2020, which can further process the modulation symbols (e.g., for OFDM). TX MIMO processor 2020 can then provides $N_T$ modulation symbol streams to $N_T$ transceivers 2022a through 2022t. In one example, each transceiver 2022 can receive and process a respective symbol stream to provide one or more analog signals. Each transceiver 2022 can then further condition (e.g., amplify, filter, and upconvert) the analog signals to provide a modulated signal suitable for transmission over a MIMO channel. Accordingly, $N_T$ modulated signals from transceivers 2022a through 2022t can then be transmitted from $N_T$ antennas 2024a through 2024t, respectively.

In accordance with another aspect, the transmitted modulated signals can be received at receiver system 2050 by $N_R$ antennas 2052a through 2052r. The received signal from each antenna 2052 can then be provided to respective transceivers 2054. In one example, each transceiver 2054 can condition (e.g., filter, amplify, and downconvert) a respective received signal, digitize the conditioned signal to provide samples, and then processes the samples to provide a corresponding "received" symbol stream. An RX MIMO/data processor 2060 can then receive and process the $N_R$ received symbol streams from $N_R$ transceivers 2054 based on a particular receiver processing technique to provide $N_T$ "detected" symbol streams. In one example, each detected symbol stream can include symbols that are estimates of the modulation symbols transmitted for the corresponding data stream. RX processor 2060 can then process each symbol stream at least in part by demodulating, deinterleaving, and decoding each detected symbol stream to recover traffic data for a corresponding data stream. Thus, the processing by RX processor 2060 can be complementary to that performed by TX MIMO processor 2020 and TX data processor 2014 at transmitter system 2010. RX processor 2060 can additionally provide processed symbol streams to a data sink 2064.

In accordance with one aspect, the channel response estimate generated by RX processor 2060 can be used to perform space/time processing at the receiver, adjust power levels, change modulation rates or schemes, and/or other appropriate actions. Additionally, RX processor 2060 can further estimate channel characteristics such as, for example, signal-to-noise-and-interference ratios (SNRs) of the detected symbol streams. RX processor 2060 can then provide estimated channel characteristics to a processor 2070. In one example, RX processor 2060 and/or processor 2070 can further derive an estimate of the "operating" SNR for the system. Processor 2070 can then provide channel state information (CSI), which can comprise information regarding the communication link and/or the received data stream. This information can include, for example, the operating SNR. The CSI can then be processed by a TX data processor 2018, modulated by a modulator 2080, conditioned by transceivers 2054a through 2054r, and transmitted back to transmitter system 2010. In addition, a data source 2016 at receiver system 2050 can provide additional data to be processed by TX data processor 2018.

Back at transmitter system 2010, the modulated signals from receiver system 2050 can then be received by antennas 2024, conditioned by transceivers 2022, demodulated by a demodulator 2040, and processed by a RX data processor 2042 to recover the CSI reported by receiver system 2050. In one example, the reported CSI can then be provided to processor 2030 and used to determine data rates as well as coding and modulation schemes to be used for one or more data streams. The determined coding and modulation schemes can then be provided to transceivers 2022 for quantization and/or use in later transmissions to receiver system 2050. Additionally and/or alternatively, the reported CSI can be used by processor 2030 to generate various controls for TX data processor 2014 and TX MIMO processor 2020. In another example, CSI and/or other information processed by RX data processor 2042 can be provided to a data sink 2044.

In one example, processor 2030 at transmitter system 2010 and processor 2070 at receiver system 2050 direct operation at their respective systems. Additionally, memory 2032 at transmitter system 2010 and memory 2072 at receiver system 2050 can provide storage for program codes and data used by processors 2030 and 2070, respectively. Further, at receiver system 2050, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   performing blind decoding with respect to a control channel;
   identifying a set of candidate grants based on the blind decoding;

discarding respective candidate grants deemed to be invalid based on at least one criterion, thereby resulting in zero or more remaining candidate grants; and selecting zero or more candidate grants from among the zero or more remaining candidate grants.

2. The method of claim 1, wherein the control channel carries resource allocation information for a Physical Downlink Shared Channel (PDSCH) or a Relay PDSCH (R-PDSCH).

3. The method of claim 2, wherein the control channel comprises a Physical Downlink Control Channel (PDCCH).

4. The method of claim 3, wherein the discarding comprises:
identifying an operation mode;
constructing a set of valid radio network temporary identifier (RNTI) values corresponding to the operation mode; and
discarding respective candidate grants determined to have RNTI values not included in the set of valid RNTI values.

5. The method of claim 4, wherein the constructing comprises adding a connected RNTI (C-RNTI) value to the set of valid RNTI values in response to identifying a connected operation mode.

6. The method of claim 4, wherein the constructing comprises one or more of:
adding a paging RNTI (P-RNTI) value to the set of valid RNTI values in response to identifying a paging occasion;
adding a system information RNTI (SI-RNTI) value to the set of valid RNTI values in response to identifying a time interval in which system information is to be monitored or received; or
adding a random access RNTI (RA-RNTI) value to the set of valid RNTI values in response to identifying a Random Access Channel (RACH) procedure.

7. The method of claim 4, wherein the constructing comprises one or more of:
adding a transmit power control for Physical Uplink Control Channel RNTI (TPC-PUCCH-RNTI) value to the set of valid RNTI values in response to identifying a downlink configuration; or
adding a transmit power control for Physical Uplink Shared Channel RNTI (TPC-PUSCH-RNTI) value to the set of valid RNTI values in response to identifying an uplink configuration.

8. The method of claim 1, wherein the discarding comprises:
checking payload of respective candidate grants for validity according to one or more criteria; and
discarding respective candidate grants found to have invalid payload based on the checking.

9. The method of claim 8, wherein the discarding further comprises:
identifying an expected pattern to be utilized for respective filler bits within a grant; and
discarding respective candidate grants having payload comprising at least one filler bit that does not conform to the expected pattern.

10. A wireless communications apparatus, comprising:
a memory that stores data relating to a set of candidate grants; and
a processor coupled to the memory, and configured to:
perform blind decoding with respect to a control channel,
identify the set of candidate grants based on the blind decoding,
discard respective candidate grants deemed to be invalid based on at least one criterion, thereby resulting in zero or more remaining candidate grants, and
select zero or more candidate grants from among the zero or more remaining candidate grants.

11. The wireless communications apparatus of claim 10, wherein the control channel carries resource allocation information for a Physical Downlink Shared Channel (PDSCH) or a Relay PDSCH (R-PDSCH).

12. The wireless communications apparatus of claim 11, wherein the control channel comprises a Physical Downlink Control Channel (PDCCH).

13. The wireless communications apparatus of claim 12, wherein:
the memory further stores data relating to an operation mode; and
the processor is further configured to construct a set of valid radio network temporary identifier (RNTI) values corresponding to the operation mode and to discard respective candidate grants determined to have RNTI values not included in the set of valid RNTI values.

14. The wireless communications apparatus of claim 12, wherein the processor is further configured to check payload of respective candidate grants for validity according to one or more criteria and to discard respective candidate grants found to have invalid payload.

15. The wireless communications apparatus of claim 14, wherein:
the memory further stores data relating to an expected pattern to be utilized for respective filler bits within a grant; and
the processor is further configured to discard respective candidate grants having payload comprising at least one filler bit that does not conform to the expected pattern.

16. An apparatus, comprising:
means for performing blind decoding with respect to a control channel;
means for identifying a set of candidate grants based on the blind decoding;
means for discarding respective candidate grants deemed to be invalid based on at least one factor to obtain zero or more remaining candidate grants; and
means for selecting zero or more candidate grants from among the zero or more remaining candidate grants.

17. The apparatus of claim 16, wherein the control channel comprises a Physical Downlink Control Channel (PDCCH).

18. The apparatus of claim 17, wherein the means for discarding comprises: means for identifying an operation mode; means for constructing a set of valid radio network temporary identifier (RNTI) values corresponding to the operation mode; and means for discarding respective candidate grants determined to have RNTI values not included in the set of valid RNTI values.

19. The apparatus of claim 16, wherein the control channel comprises a Physical Broadcast Channel (PBCH).

20. The apparatus of claim 16, wherein the means for discarding comprises:
means for checking payload of respective candidate grants for validity according to one or more factors; and
means for discarding respective candidate grants found to have invalid payload based on operation of the means for checking.

21. The apparatus of claim 20, wherein the means for discarding further comprises:
means for identifying a set of device capabilities; and
means for discarding respective candidate grants having payload indicative of one or more parameters outside of the set of device capabilities.

22. The apparatus of claim 20, wherein the means for discarding further comprises means for discarding respective candidate grants having payload indicative of at least one of an invalid resource block size, an invalid modulation or coding scheme, invalid precoding information, an invalid bandwidth configuration value, or a resource allocation outside of a supported resource range.

23. The apparatus of claim 20, wherein the means for discarding further comprises:
    means for identifying an expected pattern to be utilized for respective filler bits within a grant; and
    means for discarding respective candidate grants having payload comprising at least one filler bit that does not conform to the expected pattern.

24. The apparatus of claim 16, wherein the means for selecting comprises means for selecting zero or more candidate grants from among the zero or more remaining candidate grants based on at least one of aggregation levels associated with the zero or more remaining candidate grants or energy metrics associated with decoding performed with respect to the zero or more remaining candidate grants.

25. The apparatus of claim 16, wherein the means for selecting comprises:
    means for separating the zero or more remaining candidate grants into remaining uplink grants and remaining downlink grants; and
    means for selecting at least one of a remaining uplink grant or a remaining downlink grant from among the zero or more remaining candidate grants.

26. A computer program product stored on a non-transitory computer-readable medium, and comprising code for causing a computer to:
    perform blind decoding with respect to a control channel;
    identify a set of candidate grants based on the blind decoding;
    discard respective candidate grants deemed to be invalid based on at least one factor to obtain zero or more remaining candidate grants; and
    select zero or more candidate grants from among the zero or more remaining candidate grants.

27. The computer program product of claim 26, wherein the control channel comprises a Physical Downlink Control Channel (PDCCH).

28. The computer program product of claim 26, wherein the code for causing the computer to discard causes the computer to:
    identify an operation mode;
    construct a set of valid radio network temporary identifier (RNTI) values corresponding to the operation mode; and
    discard respective candidate grants determined to have RNTI values not included in the set of valid RNTI values.

29. The computer program product of claim 26, wherein the code for causing a computer to discard causes the computer to:
    check payload of respective candidate grants for validity according to one or more factors; and
    discard respective candidate grants found to have invalid payload based on operation of the code for checking.

* * * * *